(12) United States Patent
White et al.

(10) Patent No.: US 12,485,211 B2
(45) Date of Patent: Dec. 2, 2025

(54) MOBILE MEDICAL FLUID GENERATION SYSTEM

(71) Applicants: BAXTER HEALTHCARE SA, Glattpark (CH); BAXTER INTERNATIONAL INC., Deerfield, IL (US)

(72) Inventors: James White, Grayslake, IL (US); Jonas Fors, Malmö (SE); Fréderic Vandemaele, Lubbeek (BE); Stefano Ganzerli, Medolla (IT); Olof Jansson, Vellinge (SE); Thomas Hertz, Lund (SE); Michael Pettersson, Malmö (SE); Per-Olof Borgqvist, Lund (SE); Sven Gustafson, Lund (SE); Roland Persson, Limhamn (SE); Jonas Alson, Lund (SE); Anna Szilagyi, Lund (SE)

(73) Assignees: BAXTER HEALTHCARE SA, Glattpark (CH); BAXTER INTERNATIONAL INC, Deerfield, IL (US)

( * ) Notice: Subject to any disclaimer, the term of this patent is extended or adjusted under 35 U.S.C. 154(b) by 409 days.

(21) Appl. No.: 18/031,819

(22) PCT Filed: Oct. 21, 2021

(86) PCT No.: PCT/EP2021/079149
§ 371 (c)(1),
(2) Date: Apr. 13, 2023

(87) PCT Pub. No.: WO2022/084422
PCT Pub. Date: Apr. 28, 2022

(65) Prior Publication Data
US 2023/0381389 A1 Nov. 30, 2023

(30) Foreign Application Priority Data
Oct. 22, 2020 (IT) .......................... 102020000025099

(51) Int. Cl.
*A61M 1/16* (2006.01)
*B01D 3/00* (2006.01)
(Continued)

(52) U.S. Cl.
CPC ........ *A61M 1/1656* (2013.01); *A61M 1/1657* (2022.05); *A61M 1/166* (2014.02);
(Continued)

(58) Field of Classification Search
CPC .. A61M 1/1656; A61M 1/1657; A61M 1/166; A61M 1/1666; A61M 1/1668;
(Continued)

(56) References Cited

U.S. PATENT DOCUMENTS 5,932,110 A 8/1999 Shah et al.
2011/0189048 A1 8/2011 Curtis et al.
(Continued)

FOREIGN PATENT DOCUMENTS

CN 110075380 A 8/2019
EP 0491981 A1 7/1992
(Continued)

OTHER PUBLICATIONS

English translation of Chinese Patent Application No. 110075380 A (2019).*
(Continued)

*Primary Examiner* — John Kim
(74) *Attorney, Agent, or Firm* — K&L Gates LLP

(57) ABSTRACT

A mobile dialysis fluid generation system includes a cargo unit configured to be transported by a vehicle; a cleanroom located inside the cargo unit; water purification equipment; at least one dialysis fluid preparation unit located inside the cleanroom; and at least one area provided outside the cleanroom but inside the cargo unit for storing at least one of a raw material or containers filled with dialysis fluid. The (Continued)

at least one dialysis fluid preparation unit includes at least one concentrate, a mixing device configured to receive purified water from the water purification equipment and to mix the purified water with the at least one concentrate to form dialysis fluid, and a tubing set for transfer of the dialysis fluid from the mixing device to a container positioned and arranged to receive the dialysis fluid.

24 Claims, 17 Drawing Sheets

(51) Int. Cl.
| | |
|---|---|
| *B01D 29/00* | (2006.01) |
| *B01D 61/00* | (2006.01) |
| *B01D 61/02* | (2006.01) |
| *B01D 61/08* | (2006.01) |
| *B01D 61/18* | (2006.01) |
| *B01D 61/28* | (2006.01) |
| *B01D 61/42* | (2006.01) |
| *B01J 47/00* | (2017.01) |
| *B64D 9/00* | (2006.01) |

(52) U.S. Cl.
CPC ........ *A61M 1/1666* (2014.02); *A61M 1/1668* (2014.02); *A61M 1/1672* (2014.02); *A61M 1/1674* (2014.02); *A61M 1/1678* (2013.01); *B01D 3/00* (2013.01); *B01D 29/00* (2013.01); *B01D 61/0022* (2022.08); *B01D 61/025* (2013.01); *B01D 61/08* (2013.01); *B01D 61/18* (2013.01); *B01D 61/28* (2013.01); *B01D 61/428* (2022.08); *B01J 47/00* (2013.01); *B64D 9/00* (2013.01); *A61M 2205/7509* (2013.01); *A61M 2205/7518* (2013.01); *A61M 2205/84* (2013.01); *A61M 2209/08* (2013.01)

(58) Field of Classification Search
CPC .............. A61M 1/1672; A61M 1/1674; A61M 1/1678; A61M 2205/7509; A61M 2205/7518; A61M 2205/84; A61M 2209/08; B01D 3/00; B01D 29/00; B01D 61/0022; B01D 61/025; B01D 61/08; B01D 61/18; B01D 61/28; B01D 61/428; B01J 47/00; B64D 9/00
See application file for complete search history.

(56) References Cited

U.S. PATENT DOCUMENTS

| | | |
|---|---|---|
| 2019/0145118 A1 | 5/2019 | Gauthier et al. |
| 2020/0061273 A1 | 2/2020 | Hogard et al. |
| 2020/0170865 A1 | 6/2020 | Maccariello et al. |

FOREIGN PATENT DOCUMENTS

| | | |
|---|---|---|
| EP | 3197518 A2 | 8/2017 |
| GB | 2362843 A | 12/2001 |
| WO | 2007/118235 A2 | 10/2007 |
| WO | 2016/049542 A2 | 3/2016 |
| WO | 2016/049542 A3 | 3/2016 |

OTHER PUBLICATIONS

International Search Report from International Patent Application No. PCT/EP2021/079149, mailed May 11, 2022, 7 pages.
Written Opinion from International Patent Application No. PCT/EP2021/079149, mailed May 11, 2022, 10 pages.

* cited by examiner

MOBILE MEDICAL FLUID GENERATION SYSTEM

PRIORITY CLAIM

This application is a national phase entry of PCT/EP2021/079149, filed Oct. 21, 2021, which claims priority to Italian Patent Application No. 102020000025099, filed Oct. 22, 2020, the entire disclosures of which are incorporated herein by reference.

BACKGROUND

The present disclosure relates generally to medical fluid treatments and in particular to the preparation of medical fluids for treatment.

Due to various causes, a person's renal system can fail. Renal failure produces several physiological derangements. It is no longer possible to balance water and minerals or to excrete daily metabolic load. Toxic end products of metabolism, such as, urea, creatinine, uric acid and others, may accumulate in a patient's blood and tissue.

Reduced kidney function and, above all, kidney failure is treated with dialysis. Dialysis removes waste, toxins and excess water from the body that normal functioning kidneys would otherwise remove. Dialysis treatment for replacement of kidney functions is critical to many people because the treatment is lifesaving.

One type of kidney failure therapy is dialysis, including Hemodialysis ("HD"), which in general uses diffusion to remove waste products from a patient's blood. A diffusive gradient occurs across the semi-permeable dialyzer between the blood and an electrolyte solution called dialysate or dialysis fluid to cause diffusion.

Hemofiltration ("HF") is an alternative renal replacement therapy that relies on a convective transport of toxins from the patient's blood. HF is accomplished by adding substitution or replacement fluid to the extracorporeal circuit during treatment. The substitution fluid and the fluid accumulated by the patient in between treatments is ultrafiltered over the course of the HF treatment, providing a convective transport mechanism that is particularly beneficial in removing middle and large molecules.

Hemodiafiltration ("HDF") is a treatment modality that combines convective and diffusive clearances. HDF uses dialysis fluid flowing through a dialyzer, similar to standard hemodialysis, to provide diffusive clearance. In addition, substitution solution is provided directly to the extracorporeal circuit, providing convective clearance.

Each of HD, HF and HDF (and corresponding continuous treatment modalities, namely, continuous veno venous ("CVV") CVVHD, CVVH and CVVHDF) may be used to treat acute kidney injury ("AKI"). AKI is more common than most people know and is under-recognized in hospital patients, especially in certain countries. It has been reported that worldwide, twenty percent of hospitalized patients have AKI. A larger number of intensive care unit ("ICU") patients have AKI, where fifteen to twenty-five percent of such patients receive some form of renal replacement therapy ("RRT"). Approximately twenty-seven percent of pediatric and young adult ICU patients develop AKI during the first week after admission to the hospital.

AKI is associated with a nearly ten-fold increased risk of inpatient mortality. AKI is also associated with adverse long term outcomes, such as hypertension, chronic kidney disease, endstage renal disease and mortality. Major contributors to AKI include septic shock, major surgery, cardiogenic shock, hypovolaemia, drug induced, hepatorenal syndrome and obstructive uropathy.

AKI may also be brought on by disease, such as COVID-19, which is caused by the coronavirus. This may occur with patients who had no underlying kidney problems before being infected with the coronavirus. Certain reports have stated that up to 30% of patients hospitalized with COVID-19 in China and New York have developed moderate or severe kidney injury. Signs of kidney problems in patients with COVID-19 include high levels of protein in the urine and abnormal blood work.

The reason for the impact of COVID-19 on the kidneys as of the filing date of the present application is not yet clear. It is believed that the coronavirus might target kidney cells. The virus itself infects the cells of the kidney, which have receptors to which the new coronavirus is able to attach, invade, and make copies of itself, potentially damaging those tissues.

Another possibility is that kidney problems in patients with the coronavirus are due to abnormally low levels of oxygen in the blood, which is a result of the pneumonia commonly seen in severe cases of the disease. Too little oxygen can cause kidneys to malfunction.

The body's reaction to the infection may be responsible as well. The immune response to the new coronavirus can be extreme in some people, leading to what is called a cytokine storm. When that happens, the immune system sends a rush of cytokines into the body. Cytokines are small proteins that help the cells to communicate as the immune system fights an infection. But the sudden, large influx of cytokines can cause severe inflammation. In trying to kill the invading virus, the inflammation can destroy healthy tissue, including that of the kidneys.

Another possibility is that COVID-19 causes blood clots that might clog the kidneys. The kidneys filter blood to remove toxins, extra water and waste products from the body. COVID-19 can cause tiny clots to form in the bloodstream, which may clog the smallest blood vessels in the kidney and impair its function.

Whatever the cause and effect relationship between COVID-19 and AKI may be, the kidney damage in some cases is severe enough to require dialysis. As of the filing date of the present application, many hospitals have reported shortages for both the machines that treat AKI and the treatment fluids needed to perform these kidney procedures.

A need exists accordingly to provide an improved system to meet periods of high treatment demand for AKI or for other unique or specific applications, such as home dialysis using a bagged treatment fluid.

SUMMARY

The present disclosure sets forth systems that may, but do not have to be, used in an emergency situation in which a shortage of dialysis fluid exists, e.g., during a pandemic in which the disease results in kidney failure. The system may be mobile, e.g., provided in a cargo unit or other self-contained, transportable modality, which may be loaded onto a flatbed truck or railroad car for transportation, or which may be constructed on wheels to be attached to a truck directly.

Inside the cargo unit, a plurality of dialysis fluid preparation units are provided. The dialysis fluid preparation units may, for example, include mixing devices or dialysis machines that include the ability to produce dialysis fluid online for treatment, and which operate with water purification equipment. The cargo unit receives tap water, e.g., via an external hose, which may be run through a pretreatment subsystem and a water purifier unit and delivered to the mixing devices or dialysis machines. The purified water in an embodiment is at least of a quality that it is suitable for dialysis, which may be termed water for dialysis ("WFD"). The dialysis machines mix the WFD with concentrates, such as an acid concentrate and a bicarbonate concentrate to form a dialysis fluid.

The dialysis machines may be run in a non-treatment mode, such as a bypass mode, which uses a recirculation container to recirculate dialysis fluid through the machine. The bypass mode enables the dialysis fluid to be mixed and delivered to dialysis fluid containers or bags and to avoid alarms associated with treatment, such as pressure alarms. The dialysis machine outputs through a line, such as a flexible tube, to an outer compartment (outside of the hollow fiber membranes) connector of a dialyzer or to the inlet of another filter, such as an ultrafilter. The other outer compartment connector of the dialyzer is capped as is one of the inner compartment (inside of the hollow fiber membranes) connectors, which forces the dialysis fluid entering the dialyzer to flow through the walls of and into the insides of the dialyzer's hollow fiber membranes, and then out through the non-capped inner compartment connector. Such "outside-in" filtration may not be preferred due to the risk for fiber collapse. An "inside-out" type of filtration provided by an ultrafilter accordingly may be a preferred filtration mechanism. The ultrafilter (or dialyzer) membranes act as a final stage of purification prior to the bagging of the dialysis fluid. The dialysis fluid exits the ultrafilter or dialyzer through a line, such as a flexible tube, and flows through a connector connected to a presterilized and empty container or bag, where the dialysis fluid is stored for use.

Each of the structures above, including the water purification equipment (pretreatment subsystem and water purifier), dialysis machines, concentrates and disposable items may be provided within a cleanroom that may be positioned in any desirable area of the cargo unit. Within that cleanroom in one embodiment is a laminar HEPA air flow station under which the dialysis fluid is transferred from the dialysis machine via the connector to the bag. The laminar HEPA air flow provides additional protection against pathogens entering the presterilized container or bag during the connection step. A tilted tray may be provided inside of the laminar air flow station or hood for angling the containers or bags as they are connected to the dialysis fluid lines for filling. Doing so helps to prevent drips, which may lead to contamination within the cleanroom. The tilted or angled tray may be connected to a swivel base that allows the tilted tray to be swiveled back and forth to direct a particular container or bag towards one of the dialysis fluid filling lines. After connection, the container or bag may be removed from the tilted tray onto the table surface of the air flow station or hood for filling. In this manner, a single tilted tray is able to handle multiple container fills. The containers or bags may be weighed while being filled to know when the containers are full.

Consumables needed to allow the system to run for multiple, e.g., thirty, days until the emergency shortage subsides are stored outside the cleanroom but inside the cargo unit. For example, one end of the cargo unit may be dedicated to storing raw materials, such as presterilized containers, ultrafilters, dialyzers or other filters, tubes or tubing sets, concentrates and connectors, adapters and other needed fittings. A gowning area for entering the cleanroom is provided in one embodiment between the raw material storage area and the cleanroom. A storage area for storing finished products, e.g., containers filled with fresh dialysis fluid is provided at the opposing end of the cargo unit. A de-gowning area for leaving the cleanroom is provided in one embodiment between the finished product storage area and the cleanroom. Any one or more or all of the areas outside the cleanroom but inside the cargo unit may be provided with one or more disinfecting device, such as ultraviolet ("UV") lighting and/or disinfectant sprayers or misters to disinfect operators and materials prior to entering the cleanroom.

Consumables needed to allow the system to run for multiple, e.g., thirty, days until the emergency shortage subsides may include, for example, one dialyzer or other filter and tubing set per each dialysis machine, and enough containers or bags to make two-hundred filled containers of fresh dialysis fluid per day over multiple days. In one embodiment, each container has a minimum shelf life of twenty-four hours after preparation. When the shortage at the particular hospital or other medical facility has subsided, the mobile cargo unit may then be restocked and transported to the next facility, e.g., a different hospital, for operation. The mobile cargo unit may also be restocked with raw materials periodically as it is producing dialysis solution for a particular hospital or clinic.

One or more final stage or sterile sterilizing grade filters may be provided, e.g., integral to a final solution container, to sterilize the dialysis fluid to the point that it may be used as substitution or replacement fluid for hemofiltration ("HF") or hemodiafiltration ("HDF") (CVVH and CVVHDF for respective continuous veno venous ("CVV") modalities). A label printer is provided in one embodiment, e.g., as part of the dialysis machine, e.g., HD machine, which is adhered to the container or bag. The label provides information concerning the HD fluid, such as, the date and time at which the dialysis fluid will expire (e.g., including time on therapy), the type or formulation of the HD fluid, the quantity of the HD fluid, and other desired information, e.g., machine identification that prepared the HD fluid, operator identification, lot number, etc. In the mobile cargo unit system discussed above, a label printer may be provided within the cargo unit separate from the dialysis machines, for example, outside the cleanroom in the finished goods area.

A tubing set usable with the dialysis machine for making bagged or stored dialysis fluid may include one or more final stage or sterile sterilizing grade filters, e.g., integral to the final solution container, which is/are provided to sterilize the dialysis fluid to the point that it may be delivered to the blood lines directly as replacement or substitution fluid. In one embodiment, the one or more filters is/are provided upstream of multiple containers or bags, which are ganged in series, in parallel or both. A pressure transmission line is provided in one embodiment, which leads back to the dialysis machine, and which allows the dialysis fluid pressure to be measured. When the pressure changes by a characteristic amount, filling is complete and the dialysis machine stops dialysis fluid production and delivery. An additional line may be provided downstream from the containers, which leads back to the hemodialysis machine for testing the HD fluid. A remote valve station, e.g., under wired or wireless control of the dialysis machine, may be provided to selectively open and close dialysis fluid lines leading to the containers.

The mobile cargo unit, including any of the embodiments for it described herein, may use the pressure feedback to determine when dialysis fluid filling is complete. Alternatively, any of the systems described herein may use other volumetric controls, such as, counting known stroke volumes of the pump of the dialysis machine that is used to pump the dialysis fluid, using a balance chamber, using a known flowrate and time, using a weigh scale, and/or using a sensor at the container or bag for detecting a filled liquid level, e.g., an optical or capacitance sensor. It is also contemplated that any of the systems described herein may fill multiple containers or bags as part of a set of containers or bags, e.g., in series, parallel or both.

It is also contemplated to prepare dialysis fluid or replacement/substitution fluid not as a final mixed solution but instead as a pair of concentrate mixtures stored in separate chambers of a dual chamber container or bag, e.g., a dual chamber bag separated by a frangible seal. The dialysis machine, e.g., HD machine, mixes A-concentrate or acid with WFD and delivers the mixture to an A-concentrate compartment of the dual chamber container. The dialysis machine, e.g., HD machine, mixes B-concentrate or bicarbonate with WFD and delivers that mixture to a B-concentrate compartment of the dual chamber container. The concentrations and volumes of the acid and bicarbonate mixtures are set and controlled so that when the frangible seal is ruptured, the concentrate mixtures mix to form an overall HD or replacement/substitution fluid solution in a desired overall volume, such as, one, two, four, five or six liters.

It is also contemplated for any of the systems described herein that fill multiple containers or bags as part of a set of containers or bags, e.g., in series or parallel, to separate the containers or bags from a remainder of the tubing set using a handheld heat sealer. After filling, the operator makes one or more heat seal welds to the filling line just outside the container or bag. The operator then cuts the containers or bags from the remainder of the tubing set using scissors or perhaps the heat sealer itself. The separated and filled containers may then be labeled and transported to the point of use or to a storage area for later use.

Moreover, while the present specification is described mainly for the production of blood dialysis treatment fluids, the present teachings are equally applicable to making peritoneal dialysis ("PD") or NaCl fluids in a mobile setting.

In light of the disclosure set forth herein, and without limiting the disclosure in any way, in a first aspect, which may be combined with any other aspect or portion thereof described herein: a mobile dialysis fluid generation system includes a cargo unit configured to be transported by a vehicle; a cleanroom located inside the cargo unit; water purification equipment; at least one dialysis fluid preparation unit located inside or outside the cleanroom, the at least one dialysis fluid preparation unit including at least one concentrate, a mixing device configured to receive purified water from the water purification equipment and to mix the purified water with the at least one concentrate to form dialysis fluid, a tubing set for transfer of the dialysis fluid from the mixing device to a container positioned and arranged inside the cleanroom to receive the dialysis fluid; and at least one area provided outside the cleanroom but inside the cargo unit for storing at least one of a raw material or containers filled with dialysis fluid.

In a second aspect, which may be combined with any other aspect or portion thereof described herein, the cleanroom includes a laminar flow hood positioned and arranged to direct purified air in a laminar manner to a location at which the dialysis fluid is received by the container.

In a third aspect, which may be combined with any other aspect or portion thereof described herein, the mobile dialysis fluid generation system includes a plurality of the containers configured to receive dialysis fluid from at least one dialysis fluid preparation unit, and wherein the laminar flow hood includes a tilted tray for holding and angling one of the containers upwardly for connecting to a filling line delivering the dialysis fluid.

In a fourth aspect, which may be combined with any other aspect or portion thereof described herein, the tilted tray is configured to swivel so that the container angled by the tray may be directed upwardly to an open filling line extending from one or more of mixing device.

In a fifth aspect, which may be combined with any other aspect or portion thereof described herein, the tilted tray is tilted at an angle of 15° to 90°.

In a sixth aspect, which may be combined with any other aspect or portion thereof described herein, the water purification equipment is at least one of (i) located inside the cleanroom or (ii) includes at least one form of purification selected from the group consisting of: reverse osmosis ("RO"), ultraviolet ("UV") radiation, electrodionizaion, ultrafiltration, ion-exchange resins, heat disinfection, distillation, and/or forward osmosis.

In a seventh aspect, which may be combined with any other aspect or portion thereof described herein, the mobile dialysis fluid generation system includes a conveyor leading from inside the cleanroom to outside the cleanroom.

In an eighth aspect, which may be combined with any other aspect or portion thereof described herein, the mixing device includes a dialysis machine configured to receive purified water from the water purification equipment and to mix the purified water with the at least one concentrate to form dialysis fluid.

In a ninth aspect, which may be combined with any other aspect or portion thereof described herein, the dialysis machine is operated in a non-treatment mode while receiving purified water from the water purification equipment and mixing the purified water with the at least one concentrate to form dialysis fluid.

In a tenth aspect, which may be combined with any other aspect or portion thereof described herein, the mobile dialysis fluid generation system includes a recirculation container in recirculation fluid communication with the dialysis machine to enable operation of the dialysis machine in the non-treatment mode.

In an eleventh aspect, which may be used with any other aspect or portion thereof described herein, the tubing set is provided with a filter downstream of the dialysis machine and upstream from the container, the filter provided with at least one connector blocked so that dialysis fluid delivered from the dialysis machine to the filter is forced through the pores of a plurality of membranes housed by the filter for filtration of the dialysis fluid.

In a twelfth aspect, which may be combined with any other aspect or portion thereof described herein, the filter is an ultrafilter.

In a thirteenth aspect, which may be combined with any other aspect or portion thereof described herein, the tubing set includes an outlet line leading from the filter to the container, and wherein the outlet line includes at least one additional filter.

In a fourteenth aspect, which may be combined with any other aspect or portion thereof described herein, the tubing set includes a plurality of containers positioned and arranged to receive the dialysis fluid, and which includes a filter located upstream and/or downstream of the plurality of containers.

In a fifteenth aspect, which may be combined with any other aspect or portion thereof described herein, the filter is (i) a reusable filter such as an ultrafilter or dialyzer or (ii) a sterile sterilizing grade filter packaged with the tubing set.

In a sixteenth aspect, which may be combined with any other aspect or portion thereof described herein, the filter is packaged and presterilized with the plurality of containers.

In a seventeenth aspect, which may be combined with any other aspect or portion thereof described herein, the mobile dialysis fluid generation system includes a tilted tray for holding and angling a (optionally sterile sterilizing grade) filter upwardly for connecting to a filling line delivering the dialysis fluid.

In an eighteenth aspect, which may be combined with any other aspect or portion thereof described herein, the mobile dialysis fluid generation system includes at least one of a weigh scale or a timer for controlling an amount of dialysis fluid received by the containers.

In a nineteenth aspect, which may be combined with any other aspect or portion thereof described herein, the at least one concentrate is configured to prepare dialysis fluid for a blood treatment or peritoneal dialysis, or an intravenous fluid including saline, an NaCl fluid or a nutritional fluid.

In a twentieth aspect, which may be combined with any other aspect or portion thereof described herein, a mobile medical fluid generation system includes a cargo unit configured to be transported by a vehicle; water purification equipment located inside the cargo unit; at least one concentrate located inside the cargo unit; a mixing device located inside the cargo unit and configured to receive purified water from the water purification equipment and to mix the purified water with at least one concentrate to form medical fluid; a cleanroom located inside the cargo unit, the cleanroom including a container positioned and arranged to receive the medical fluid, and a tubing set configured to deliver the medical fluid to the container; and at least one area provided outside the cleanroom but inside the cargo unit for storing at least one of a raw material including multiple tubing sets or containers filled with dialysis fluid.

In a twentieth-bis aspect, which may be combined with any other aspect or portion thereof described herein, a mobile medical fluid generation system comprises a cargo unit configured to be transported by a vehicle; a cleanroom located inside the cargo unit; water purification equipment optionally located inside the cargo unit; at least one medical fluid preparation unit located inside or outside the cleanroom, the at least one medical fluid preparation unit including: at least one concentrate optionally located inside the cargo unit; a mixing device configured to receive purified water from the water purification equipment and to mix the purified water with at least one concentrate to form medical fluid, the mixing device being optionally located inside the cargo unit; a container positioned and arranged inside the cleanroom to receive the medical fluid, and a tubing set configured to transfer of the medical fluid from the mixing device to the container; and at least one area provided outside the cleanroom but inside the cargo unit for storing at least one of a raw material including multiple tubing sets or containers filled with medical fluid.

In a twenty-first aspect, which may be combined with any other aspect or portion thereof described herein, the medical fluid is a blood treatment dialysis fluid, a peritoneal dialysis fluid, or an intravenous fluid including saline, lactated ringers, an NaCl fluid or a nutritional solution.

In a twenty-second aspect, which may be combined with any other aspect or portion thereof described herein, at least one of the water purification equipment, the at least one concentrate, or the mixing device is located inside the cleanroom.

In a twenty-third aspect, which may be combined with any other aspect or portion thereof described herein, the tubing set includes at least one sterile sterilizing grade filter for further filtering the medical fluid before reaching the container.

In a twenty-fourth aspect, which may be combined with any other aspect or portion thereof described herein, a modular cleanroom for generating medical fluid includes water purification equipment; at least one concentrate; a mixing device configured to receive purified water from the water purification equipment and to mix the purified water with the at least one concentrate to form medical fluid; at least one filter positioned an arranged to filter the medical fluid; at least one container positioned and arranged to receive the medical fluid; and a tilted tray configured to tilt a connector end of the at least one container upward for receiving a filling line extending from the at least one filter.

In a twenty-fourth-bis aspect, which may be combined with any other aspect or portion thereof described herein, a modular cleanroom for generating dialysis fluid comprising: water purification equipment; at least one container positioned and arranged to receive the dialysis fluid; at least one dialysis fluid preparation unit including: at least one concentrate; a mixing device configured to receive purified water from the water purification equipment and to mix the purified water with the at least one concentrate to form dialysis fluid; a tubing set for transfer of the dialysis fluid from the mixing device to the container arranged to receive the dialysis fluid; at least one filter positioned an arranged to filter the dialysis fluid; and, optionally, a tilted tray configured to tilt a connector end of the at least one container upward for receiving a filling line extending from the at least one filter.

In a twenty-fifth aspect, which may be combined with any other aspect or portion thereof described herein, the modular cleanroom includes a laminar flow hood positioned and arranged to direct purified air in a laminar manner to a location at which the filling line is received by the container.

In a twenty-sixth aspect, which may be combined with any other aspect or portion thereof described herein, the at least one filter is provided as a set with the at least one container.

In a twenty-seventh aspect, which may be combined with any other aspect or portion thereof described herein, a modular cleanroom for generating medical fluid includes water purification equipment; at least one concentrate; a mixing device configured to receive purified water from the water purification equipment and to mix the purified water with the at least one concentrate to form medical fluid; at least one container positioned and arranged to receive the medical fluid; a first reusable filter positioned and arranged at the mixing unit to filter the medical fluid; and a second disposable filter provided as a set with the at least one container to further filter the medical fluid, the second disposable filter located upstream of and/or downstream from the container.

In a twenty-eighth aspect, which may be combined with any other aspect or portion thereof described herein, the modular cleanroom is provided in a cargo unit configured to be transported by a vehicle.

In a twenty-ninth first aspect, which may be combined with any other aspect or portion thereof described herein, a tubing set includes a reusable filter; an inlet line leading to the reusable filter, the inlet line including an inlet connector configured to connect to a treatment fluid producing machine or to a fluid line of the treatment fluid producing machine; and an outlet line leading from the reusable filter, the outlet line including an outlet connector configured to connect to a mating connector of a presterilized treatment fluid receiving container.

In a thirtieth aspect, which may be combined with any other aspect or portion thereof described herein, the reusable filter is an ultrafilter, and which includes a priming line leading from the ultrafilter.

In a thirty-first aspect, which may be combined with any other aspect or portion thereof described herein, the inlet connector is a Hansen™ connector.

In a thirty-second aspect, which may be combined with any other aspect or portion thereof described herein, the outlet connector is a threaded connector.

In a thirty-third aspect, which may be combined with any other aspect or portion thereof described herein, a tubing set includes at least one sterile sterilizing grade filter; a plurality of presterilized medical fluid containers; and a plurality of tubes extending from the at least one sterile sterilizing grade filter to each of the plurality of medical fluid containers.

In a thirty-fourth aspect, which may be combined with any other aspect or portion thereof described herein, the tubing set includes a manifold downstream from the at least one sterile sterilizing grade filter, the plurality of tubes extending from the manifold to each of the plurality of presterilized medical fluid containers.

In a thirty-fifth aspect, which may be combined with any other aspect or portion thereof described herein, the at least one sterile sterilizing grade filter, the plurality of presterilized medical fluid containers and the plurality of tubes are connected, packaged and sterilized together.

In a thirty-sixth aspect, which may be combined with any other aspect or portion thereof described herein, a tubing arrangement includes a reusable filter including an ultrafilter or a dialyzer; an outlet line extending from the reusable filter; at least one disposable sterile sterilizing grade filter in fluid communication with the outlet line; and at least one medical fluid container located downstream from the at least one sterile sterilizing grade filter and in fluid communication with the outlet line.

In a thirty-seventh aspect, which may be combined with any other aspect or portion thereof described herein, the tubing arrangement includes an inlet line leading to the reusable filter, the inlet line including a connector configured to connect to a dialysis machine or to a reusable line extending from the dialysis machine.

In a thirty-eighth aspect, which may be combined with any other aspect or portion thereof described herein, the reusable filter is provided in a first sterilized package and the outlet line, and the at least one disposable sterile sterilizing grade filter and the at least one medical fluid container are provided in a second sterilized package.

In a thirty-ninth aspect, which may be combined with any other aspect or portion thereof described herein, a mobile medical fluid generation method includes separating a storage area for at least one of raw materials or containers filled with dialysis fluid from the outside world via a cargo unit; providing a cleanroom environment via a cleanroom within the cargo unit for purifying water and mixing the purified water with at least one concentrate to form medical fluid; and providing a laminar air flow environment via a laminar flow hood within the cleanroom for filling at least one container with the medical fluid.

In a fortieth aspect, which may be combined with any other aspect or portion thereof described herein, the mobile dialysis fluid generation method includes providing at least one of a gowning area or a de-gowning area adjacent to the cleanroom.

In a forty-first aspect, which may be combined with any other aspect or portion thereof described herein, the mobile dialysis fluid generation method includes using a dialysis machine to mix the purified water with the at least one concentrate to form the medical fluid.

In a forty-second aspect, which may be combined with any other aspect or portion thereof described herein, the mobile dialysis fluid generation method includes using an ultrafilter or dialyzer with the dialysis machine to purify the medical fluid.

In a forty-third aspect, which may be combined with any other aspect or portion thereof described herein, a medical fluid generation method includes purifying water; mixing the purified water to form a medical fluid; filtering the medical fluid using a reusable filter; connecting a filling line in fluid communication with the reusable filter to a first presterilized medical fluid container inside of a cleanroom to fill the first presterilized medical fluid container with filtered medical fluid; and removing the filled first container and connecting the filling line in fluid communication with the reusable filter to a second presterilized medical fluid container inside of the cleanroom to fill the second presterilized medical fluid container with filtered medical fluid.

In a forty-fourth aspect, which may be combined with any other aspect or portion thereof described herein, connecting and removing are performed under a laminar flow hood provided inside of the cleanroom.

In a forty-fifth aspect, which may be combined with any other aspect or portion thereof described herein, the medical fluid generation method includes at least one additional filter provided downstream of the reusable filter and in fluid communication with the filling line.

In a forty-sixth aspect, which may be combined with any other aspect or portion thereof described herein, the medical fluid generation method includes angling the first and second presterilized medical fluid containers during filling to mitigate against dripping of the medical fluid.

In a forty-seventh aspect, which may be combined with any other aspect or portion thereof described herein, a dialysis fluid generation system includes water purification equipment configured to provide purified water; a container for storing dialysis fluid, the container provided with a presterilized tubing set for use during treatment; at least one acid or bicarbonate concentrate; and a dialysis machine in fluid communication with the water purification equipment, the dialysis machine including at least one mixing pump for mixing the at least one acid or bicarbonate concentrate with the purified water to form dialysis fluid, a dialysis fluid pump for delivering the dialysis fluid to the container, and a control unit configured to control the at least one mixing pump to form the dialysis fluid and the dialysis fluid pump to deliver the dialysis fluid to the container.

In a forty-eighth aspect, which may be combined with any other aspect or portion thereof described herein, the dialysis fluid is hemodialysis fluid or replacement fluid.

In a forty-ninth aspect, which may be combined with any other aspect or portion thereof described herein, the dialysis machine includes at least one conductivity sensor outputting to the control unit as feedback to form the dialysis fluid.

In a fiftieth aspect, which may be combined with any other aspect or portion thereof described herein, the water purification equipment includes a central water purification station configured to feed a plurality of dialysis machines.

In a fifty-first aspect, which may be combined with any other aspect or portion thereof described herein, the control unit is configured to enable an operator to enter at least one of (i) a volume of dialysis fluid per container or (ii) a number of containers to be filled with dialysis fluid.

In a fifty-second aspect, which may be combined with any other aspect or portion thereof described herein, the dialysis fluid generation system includes a filter located upstream from the container, the filter configured to further purify the dialysis fluid for use as replacement fluid.

In a fifty-third aspect, which may be combined with any other aspect or portion thereof described herein, the control unit is configured to perform a pressure integrity test on the filter.

In a fifty-fourth aspect, which may be combined with any other aspect or portion thereof described herein, the dialysis fluid generation system includes a pressure transmission line in fluid communication with the container, the pressure transmission line configured to transmit dialysis fluid pressure to a pressure transducer of the dialysis machine, the control unit configured to look for a characteristic change in dialysis fluid pressure to stop the dialysis fluid pump from delivering the dialysis fluid to the container.

In a fifty-fifth aspect, which may be combined with any other aspect or portion thereof described herein, the container is a first container, and which includes a second container placed fluidly in series with the first container.

In a fifty-sixth aspect, which may be combined with any other aspect or portion thereof described herein, the container is a first container, and which includes a second container placed fluidly in parallel with the first container.

In a fifty-seventh aspect, which may be combined with any other aspect or portion thereof described herein, the container is a first container, and which includes a second container placed fluidly in series with the first container and a third container placed fluidly in parallel with the first container.

In a fifty-eighth aspect, which may be combined with any other aspect or portion thereof described herein, the container is a first container, and which includes a second container for receiving the dialysis fluid, the system including a first filling tube leading to the first container and a second filling tube leading to the second container, and which further includes a standalone valve station for selectively opening or occluding the first and second filling tubes.

In a fifty-ninth aspect, which may be combined with any other aspect or portion thereof described herein, the standalone valve station is in wired or wireless communication with the control unit of the dialysis machine for commanding the standalone valve station.

In a sixtieth aspect, which may be combined with any other aspect or portion thereof described herein, the dialysis fluid generation system includes a return line from the container to the dialysis machine for testing the dialysis fluid.

In a sixty-first aspect, which may be combined with any other aspect or portion thereof described herein, a dialysis fluid generation system includes water purification equipment configured to provide purified water; a container including a first chamber and a second chamber; an acid concentrate; a bicarbonate concentrate; and a dialysis machine in fluid communication with the water purification equipment, the dialysis machine including at least one mixing pump for mixing the acid and bicarbonate concentrates with purified water to form an acid solution and a bicarbonate solution, at least one dialysis fluid pump for delivering the acid solution and the bicarbonate solution, and a control unit configured to control the at least one mixing pump to form the acid solution and the bicarbonate solution and the at least one dialysis fluid pump to deliver the acid solution to the first chamber of the container and the bicarbonate solution to the second chamber of the container.

In a sixty-second aspect, which may be combined with any other aspect or portion thereof described herein, the dialysis machine is a hemodialysis machine and the fluid is hemodialysis fluid or replacement fluid.

In a sixty-third aspect, which may be combined with any other aspect or portion thereof described herein, the container is first container and which includes a second container having first and second chambers, and wherein the control unit is configured to deliver the acid solution to the first chamber of each of the first and second containers and the bicarbonate solution to the second chamber of each of the first and second containers.

In a sixty-fourth aspect, which may be combined with any other aspect or portion thereof described herein, the container is provided as part of a tubing set including a first filling line leading to the first chamber of the container and a second filling line leading to a second chamber of the container.

In a sixty-fifth aspect, which may be combined with any other aspect or portion thereof described herein, the first and second chambers of the container are separated by at least one frangible seal, the frangible seal openable to allow the acid solution to mix with the bicarbonate solution.

In a sixty-sixth aspect, which may be combined with any other aspect or portion thereof described herein, the dialysis fluid generation system includes a filter located upstream from the container, the filter configured to further purify the acid solution and the bicarbonate solution for use as replacement fluid after mixing.

In a sixty-seventh aspect, which may be combined with any other aspect or portion thereof described herein, the dialysis fluid generation system includes an overpouch placed over the container after delivery of the acid solution and the bicarbonate solution.

In a sixty-eighth aspect, which may be combined with any other aspect or portion thereof described herein, a dialysis fluid generation system includes water purification equipment configured to provide purified water; a container for storing dialysis fluid; a pressure transmission line in fluid communication with the container and configured to transmit dialysis fluid pressure; at least one acid or bicarbonate concentrate; and a dialysis machine in fluid communication with the water purification equipment, the dialysis machine including a pressure transducer positioned and arranged to sense the dialysis fluid pressure in the pressure transmission line, at least one mixing pump for adding the at least one acid or bicarbonate concentrate with the purified water to form dialysis fluid, a dialysis fluid pump for delivering the dialysis fluid to the container, and a control unit configured to (i) control the at least one mixing pump to form the dialysis fluid, (ii) control the dialysis fluid pump to deliver the dialysis fluid to the container, and (iii) look for a characteristic change in dialysis fluid pressure to stop the dialysis fluid pump from delivering the dialysis fluid to the container.

In a sixty-ninth aspect, which may be combined with any other aspect or portion thereof described herein, the characteristic change in dialysis fluid pressure is a characteristic change in static dialysis fluid pressure.

In a seventieth aspect, which may be combined with any other aspect or portion thereof described herein, a dialysis fluid generation system includes water purification equipment configured to provide purified water; a container including a first chamber for storing purified water and at least one second chamber prefilled with at least one of an acid or bicarbonate concentrate; and a dialysis machine in fluid communication with the water purification equipment, the dialysis machine including a fluid pump for delivering the purified water to the first chamber of the container.

In a seventy-first aspect, which may be combined with any other aspect or portion thereof described herein, the plurality of chambers are separated by at least one frangible seal openable to allow the purified water to mix with the at least one concentrate.

In a seventy-second aspect, which may be combined with any other aspect or portion thereof described herein, a dialysis fluid generation system includes water purification equipment configured to provide purified water; a container for storing dialysis fluid; a label printer configured to print a label for placement on the container, the label including dialysis fluid information; at least one concentrate; and a hemodialysis machine in fluid communication with the water purification equipment, the hemodialysis machine including at least one mixing pump for mixing the at least one concentrate with the purified water to form dialysis fluid, a dialysis fluid pump for delivering the dialysis fluid to the container, and a control unit configured to control the at least one mixing pump to form the dialysis fluid and the dialysis fluid pump to deliver the dialysis fluid to the container.

In a seventy-third aspect, which may be combined with any other aspect or portion thereof described herein, the label printer is provided by the hemodialysis machine.

In a seventy-fourth aspect, which may be combined with any other aspect or portion thereof described herein, the control unit is configured to cause the label printer to print the label during or after delivery of the dialysis fluid from the dialysis fluid pump to the container.

In a seventy-fifth aspect, which may be combined with any other aspect or portion thereof described herein, the dialysis fluid information includes at least one of: date that the dialysis fluid is prepared, time that the dialysis fluid is prepared, expiration period or date, type or formulation of the dialysis fluid, quantity of the dialysis fluid, and machine identification that prepared the dialysis fluid, operator identification, or lot number.

In a seventy-sixth aspect, which may be combined with any other aspect or portion thereof described herein, the control unit is configured to enable an operator to enter at least of (i) a volume of dialysis fluid per container or (ii) a number of containers to be filled with dialysis fluid.

In a seventy-seventh aspect, which may be combined with any other aspect or portion thereof described herein, the container is part of a tubing set, the tubing set further including at least one filter located upstream of the container.

In a seventy-eighth aspect, which may be combined with any other aspect or portion thereof described herein, the container is part of a tubing set, the tubing set further including at least one additional container.

In a seventy-ninth aspect, which may be combined with any other aspect or portion thereof described herein, the water purification equipment includes a central water purification station configured to feed a plurality of hemodialysis machines.

In an eightieth aspect, which may be combined with any other aspect or portion thereof described herein, the dialysis machine is configured to hold the container.

Additionally, any of the above aspects, or portions thereof, and/or any of the features, functionality and alternatives described in connection with any one or more of FIGS. 1 to 11 may be combined with any of the features, functionality and alternatives described in connection with any other of FIGS. 1 to 11.

It is accordingly an advantage of the present disclosure to provide a system that makes fresh dialysis fluid when additional fluid is needed, e.g., during high demand due to disease or other emergency, or for other unique or specific applications, such as home dialysis, such as peritoneal dialysis.

It is another advantage of the present disclosure to provide a system that makes fresh dialysis fluid for a hospital, clinic or patient's home with minimal resource impact to the hospital or clinic.

It is a further advantage of the present disclosure to provide a system that makes fresh dialysis fluid at or near a hospital, clinic or patient's home, and which is of a high quality.

It is yet a further advantage of the present disclosure to provide a system that makes fresh dialysis fluid at or near a hospital, clinic or patient's home, and which is filled in a solution container for later use.

It is still a further advantage to prepare dialysis fluid, e.g., HD fluid, CRRT fluid or PD fluid using one or more in-center dialysis machine.

Additional features and advantages are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein and it is expressly contemplated to claim individual advantageous embodiments separately. Moreover, it should be noted that the language used in the specification has been selected principally for readability and instructional purposes, and not to limit the scope of the inventive subject matter.

DETAILED DESCRIPTION

Figure 1:
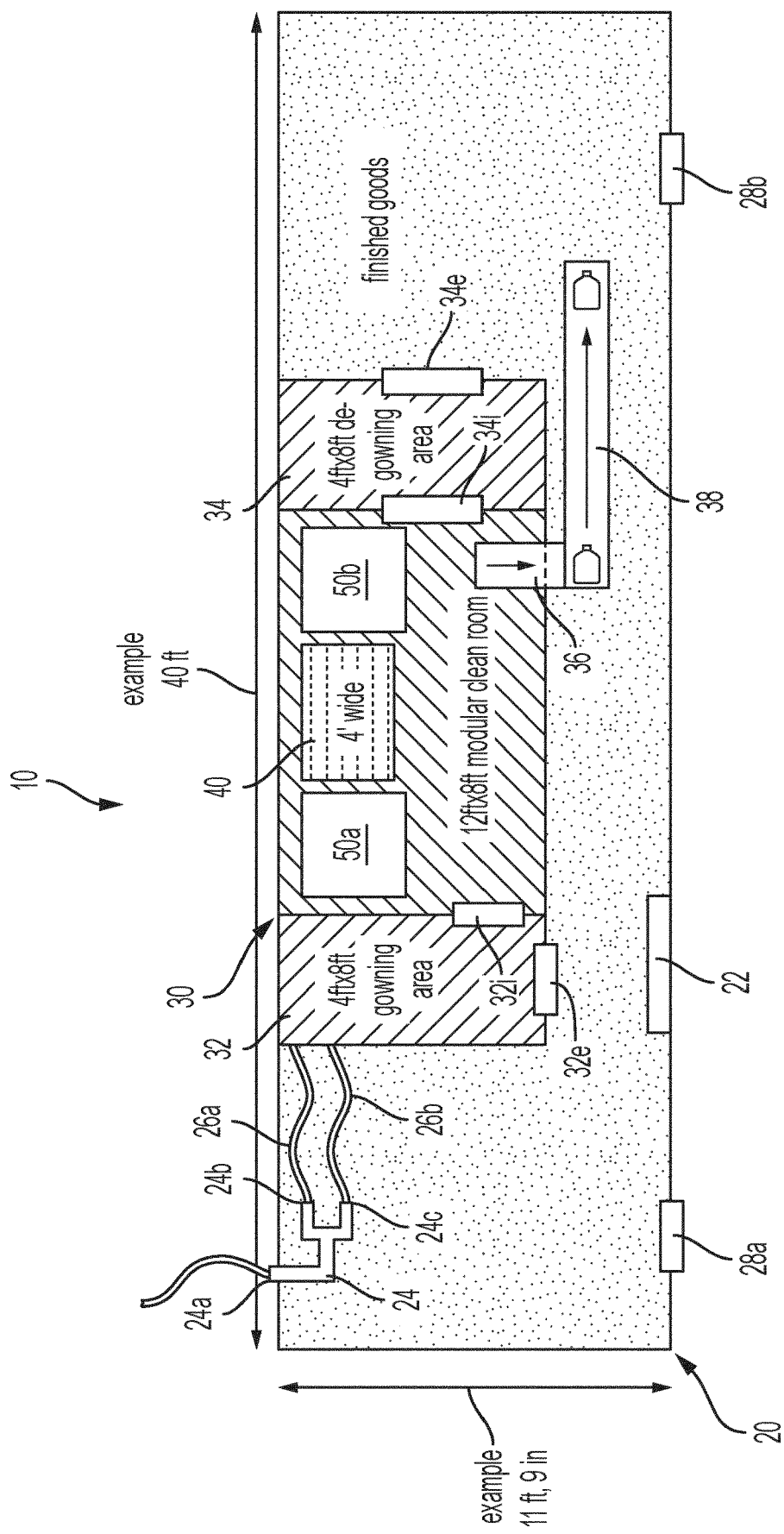
FIG. 1 is a top plan view of one embodiment for a mobile dialysis fluid generation system of the present disclosure, e.g., for emergency situations.

Referring now to the drawings and in particular to FIG. 1, an embodiment of a mobile dialysis fluid generation system is illustrated by system 10, which may for example be used in times of medical emergency. FIG. 1 illustrates that system 10 includes a cargo unit 20. Cargo unit 20 may be constructed of metal and be configured to be loaded onto a flatbed truck, railcar or other transportation medium for moving from one hospital or clinic to another, or for moving to or from a location at which cargo unit 20 of system 10 may be restocked with the raw materials discussed herein. Cargo unit 20 in the illustrated embodiment includes an electrical panel 22, e.g., fuse box, which accepts outside electrical power, e.g., 110 to 130 VAC (for United States) and 220 to 240 VAC (for United States or Europe), and which may include one or more transformers for producing any desired AC or DC for the electrical components of system 10. Cargo unit 20 may also be provided with a generator in place of or in addition to external power.

Electrical panel 22 in one embodiment powers a plurality of lights (not illustrated) located inside cargo unit 20 of system 10. At least some of the lights may be ultraviolet ("UV") lights which tend to disinfect or purify the air outside of cleanroom 30. In this manner the operator(s) reside in a semi-clean environment prior to entering cleanroom 30. Alternatively or additionally, electrical panel 22 may power disinfectant sprayers (not illustrated) that periodically spray disinfectant into the air outside of cleanroom 30. Here again, the disinfectant spray allows the operator(s) to reside in a semi-clean environment prior to entering cleanroom 30.

Cargo unit 20 as illustrated in FIG. 1 may also include plumbing 24, which includes inlet end 24a configured to connect to an external water hose brought to cargo unit 20 and connection ends 24b, 24c . . . 24n configured to connect to short flexible water hoses 26a, 26b . . . . 26n. A connection end 24a . . . 24n and a flexible water hose 26a . . . 26n are provided for each dialysis fluid preparation unit provided within the cargo unit. In the primary embodiment discussed herein, two dialysis fluid preparation units 50a, 50b are illustrated and described, however, a single or three or more dialysis fluid preparation units 50a . . . 50n may be provided instead. Water may be provided from a municipal water source or from a water truck either parked next to cargo unit 20 or from a large tank provided outside cargo unit 20, which is filled periodically by the water truck. Cargo unit 20 also includes one or more doors 28a and 28b, which allow operator entry into and exit out of the cargo unit.

FIG. 1 illustrates one possible size for cargo unit 20, which is be 40 feet (12.2 meters) long and 11 feet, 9 inches (3.6 meters) wide. Smaller cargo units may be preferred however, e.g., 8 feet (2.4 meters) wide. Cargo unit 20 includes or holds cleanroom 30, which is able to be placed in any desired location within cargo unit 20. In one embodiment, a frame defining cleanroom 30 also defines or provides a gowning area 32 and a de-gowning area 34. For example, gowning area 32 and de-gowning area 34 may be provided with exterior doors 32e and 34e, respectively, which allow entrance and exit from the overall frame forming cleanroom 30. Interior doors 32i and 34i may be provided respectively then from gowning area 32 into cleanroom 30 and from cleanroom 30 into de-gowning area 34.

In the illustrated embodiment, gowning area 32, cleanroom 30 and de-gowning area 34 are a combined 20 feet (6.1 meters) long and 8 feet (2.4 meters) wide, leaving a total of 20 feet (6.1 meters) of space to be split as desired on either side of cleanroom 30, gowning area 32 and de-gowning area 34 and 3 feet, nine inches (1.14 meters) of space in front of cleanroom 30, gowning area 32 and de-gowning area 34 (assuming such areas are placed against a wall of cargo unit 20 as illustrated in FIG. 1) for storage and operator movement.

In the illustrated embodiment of FIG. 1, workflow and operator movement is generally from left to right, where raw materials and supplies are provided to the left of gowning area 32, while finished products, e.g., bagged dialysis fluid, are located to the right of de-gowning area 34. The operator (s) may enter cargo unit 20 through leftmost door 28a, obtain needed raw materials, enter gowning area 32 via exterior door 32e, don the necessary gowns, enter cleanroom 30 via interior door 32i, operate the equipment discussed herein, enter de-gowning area 34 via interior door 34i after a shift, remove the gowns, and exit de-gowning area 34 via exterior door 34e. The finished products may be stored to the right of de-gowning area 34. At the end of a shift, the operator may exit via rightmost door 28b.

In one preferred embodiment, raw materials are transferred in a bolus into cleanroom 30 at the start of a production shift, and finished containers or bags are transferred out of the cleanroom as they are produced. Two operators may be used, one inside cleanroom 30 to fill the containers and a second operator located in the finished products area to receive, inspect, label, and package the filled containers. Alternative systems below illustrate a label printed at the mixing devices 60 (e.g., dialysis machines). For mobile cargo unit system 10, it is contemplated to place a separate label printer in the finished products area. To this end, a material pass-through conveyor 36 is provided, which allows the operator inside cleanroom 30 to load filled containers onto the conveyor. Conveyor 36 is made to be no larger than necessary and passes through an opening sized just large enough to accept the conveyor and a filled container, wherein the opening is provided in a side or front of conveyor 36, and wherein the opening is covered by one or more flap when a container is not present. Conveyer 36 feeds filled containers to an external conveyor 38 located outside of cleanroom 30, which transports the filled containers to the operator located in the finished goods area outside of the cleanroom.

Cleanroom 30 in the illustrated embodiment includes and holds a laminar flow hood 40, which is located between dialysis fluid preparation units 50a and 50b. As described in detail below, dialysis fluid preparation units 50a, 50b each output dialysis fluid to an area located within laminar flow hood 40. It is accordingly desirable in one embodiment to locate laminar flow hood 40 centrally amongst dialysis fluid preparation units 50a . . . 50n.

In an alternative embodiment, it is contemplated to provide cleanroom 30 including gowning area 32 and de-gowning area 34 as a modular "pop up" structure, which is placed in a desired location other than cargo unit 20. If it is determined that for cost, logistical, lead time or other reasons that cargo units 20 are difficult to obtain, system 10 may alternatively or additionally provide cleanroom 30 including gowning area 32 and de-gowning area 34 as a standalone unit in a desired location, such as (i) in a convention space, warehouse, auditorium, vacant retail or other suitably large space located near the hospital or clinic, (ii) in a mobile office space placed near or in proximity to the hospital or clinic, or (iii) in the hospital or clinic itself.

As mentioned, cleanrooms 30 placed in cargo units 20 may be provided under overall system 10 in addition to cleanrooms built as a modular "pop up" structure. For example, cleanrooms placed in cargo units 20 may be transported to a hospital or clinic initially while a more permanent modular "pop up" cleanroom 30 is built near or at the same hospital or clinic. When the "pop up" cleanroom 30 is complete and operational, cargo unit 20 may be moved to a different hospital or clinic in need of immediate dialysis fluid supply. Once the need for modular "pop up" cleanroom 30 has ended, it may be deconstructed, wherein reusable and expensive components are retained, while less expensive or fungible items, such as power, water or other utility items are discarded.

It should be appreciated that regardless of whether cleanroom 30 is located in cargo unit 20 or as a modular "popup" cleanroom at any of the other locations listed above, the cleanroom includes any and all structure, functionality and alternatives discussed herein.

Figure 2:
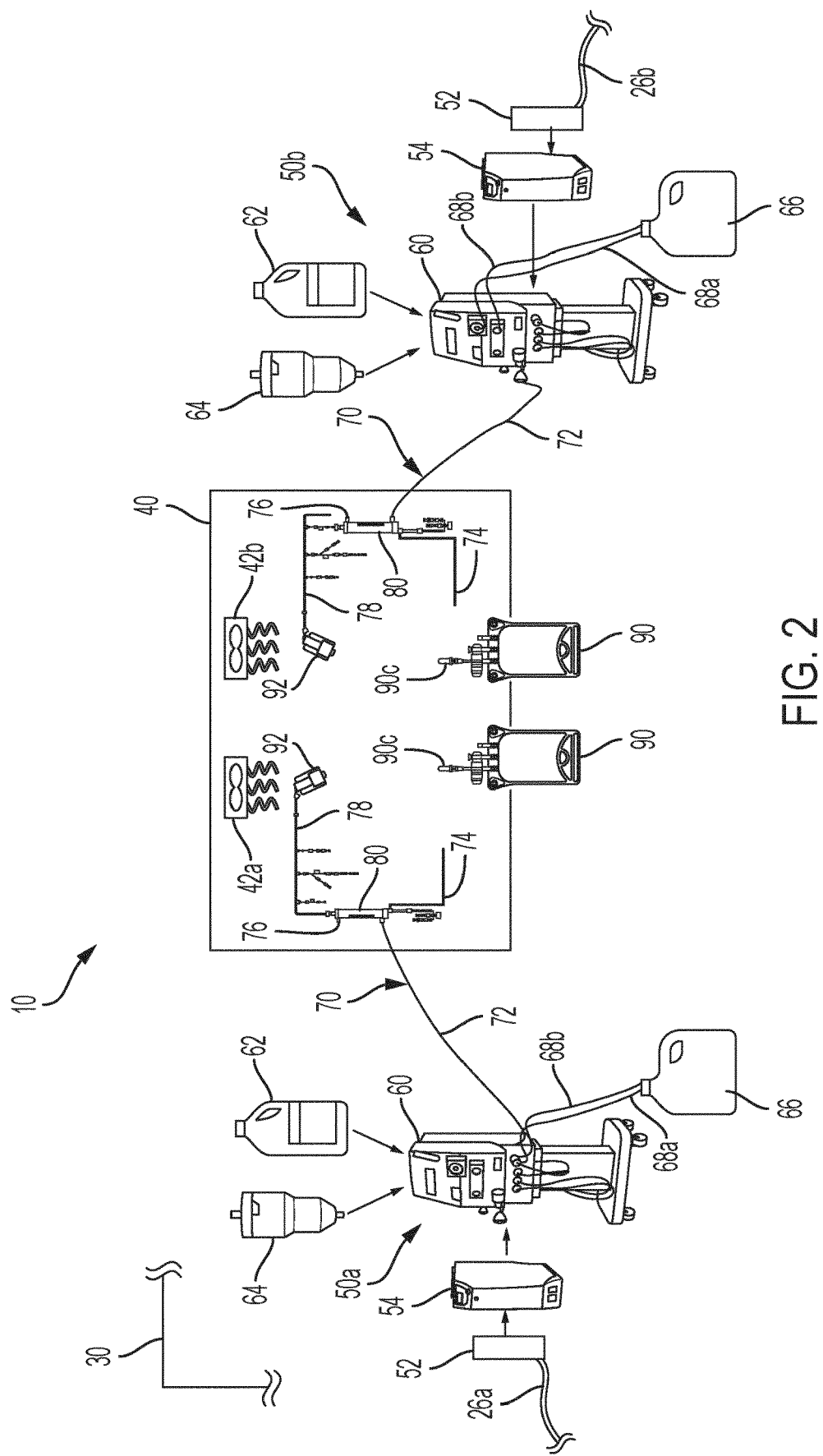
FIG. 2 is a front elevation view of one embodiment for a mobile dialysis fluid generation system of the present disclosure.

Referring now to FIG. 2, example contents provided within cleanroom 30 are illustrated in more detail. Cleanroom 30, as described with FIG. 1, includes a laminar flow hood 40 and dialysis fluid preparation units 50a and 50b. Laminar flow hood 40 in the illustrated embodiment includes laminar flow fans 42a, 42b. While two laminar flow fans 42a, 42b are illustrated, a single fan or three or more laminar flow fans 42a . . . 42n may be provided alternatively. Laminar flow fans 42a and 42b are configured to blow cleanroom or high-efficiency particulate air ("HEPA") air at a laminar flowrate, e.g., ninety feet/minute (0.46 meters/second), across an area within hood 40.

Dialysis fluid preparation units 50a, 50b each include a water pretreatment subsystem 52 connected to one of the flexible water hoses 26a for unit 50a or 26b for unit 50b. Each water pretreatment subsystem 52 may include, for example, any one or more of carbon filtration, a chlorine remover, particulate filter(s), a water softener, and/or an inline ultraviolet ("UV") disinfection device. The water pretreatment subsystems 52 output to water purifiers 54. Water purifiers 54 may include and one or more type of water purification and associated structures, including reverse osmosis ("RO"), ultraviolet ("UV") radiation, electrodeionization, ultrafiltration, ion-exchange resins, heat disinfection, distillation, and/or forward osmosis. One suitable water purifier 54 has the product name WRO300H. The water pretreatment subsystems 52 and water purifiers 54 may each be individually or collectively referred to herein as water purification equipment. It is intended that water exiting water purifier 54 be of at least a purification quality, which may be termed water for dialysis ("WFD"), suitable for use in a hemodialysis treatment or as solutions used in a continuous renal replacement therapy ("CRRT") treatment, such as HD fluid for CVVHD, replacement/substitution fluid for CVVH and CVVHDF, PD treatments and applications needing NaCl fluids.

Water purifiers 54 of dialysis fluid preparation units 50a, 50b each output to a mixing device 60 configured to receive WFD from the water purification equipment and to mix the WFD with the at least one concentrate to form dialysis fluid. Mixing device 60 in one embodiment includes a dialysis machine having the capability for the online production of dialysis fluids, such as a hemodialysis ("HD") machine. One suitable dialysis machine for system 10 is an AK 98™ Dialysis Machine marketed by the assignee of the present disclosure. Using a dialysis machine as the mixing device 60 of system 10 enables the system to be assembled relatively quickly using proven mixing technology and without having to develop and test a dedicated mixing device. It should be appreciated, however, that it is contemplated for system 10 to provide and use a dedicated mixing device 60. For example, it may be desirable for dialysis fluid preparation units 50a, 50b to provide a single machine or unit that combines one or more of water pretreatment subsystem 52 and water purifier 54 with mixing device 60. In another example, it may be desirable to develop a mixing device 60 that outputs dialysis fluid at a controlled flowrate and/or pressure, or which enables production of fixed delivery volumes to enable more automated filling.

Any embodiment or version of mixing device 60, including a dialysis machine, includes at least one mixing pump for mixing WFD from water purifier 54 with at least one concentrate 62, 64. In a version in which mixing device 60 includes a dialysis machine, the mixing device may include a water pump that pulls WFD from water purifier 54, such that water purifier 54 may, but does not have to have, its own water pump. In an alternative embodiment, water purifier 54 includes a pump that pumps WFD under positive pressure to mixing device 60. Here, mixing device 60 does not have to have a pump to pump WFD from water purifier 54.

In any case, mixing device 60 includes pumps for mixing dialysis fluid and for delivering dialysis fluid from mixing device 60. In one embodiment, mixing device 60 includes a B-concentrate pump for metering WFD through a bicarbonate cartridge 64 and adding the bicarbonate concentrated water to a mixture of liquid acid concentrate from concentrate container 62 and WFD, wherein the liquid acid is metered by an A-concentrate pump. Conductivity cells are used in one embodiment to ensure the proper mixing of bicarbonate concentrate with WFD and the mixture of bicarbonate concentrate and WFD with acid concentrate. The conductivity readings may be temperature compensated.

Mixing device 60 may also include a heater, such as an inline heater. The heater may (e.g., to promote mixing) or may not be energized during the preparation of the dialysis fluid. Mixing device 60 also includes a pump for delivering fresh (possibly heated) dialysis fluid. In the version of system 10 in which mixing device 60 is a dialysis machine, the mixing device may place the dialysis machine in a non-treatment mode, such as a bypass mode, which enables the dialysis fluid to be delivered at a desired pressure and/or flowrate, e.g., 750 mm Hg or less and 300 to 800 mL/min, e.g., 500 mL/min. To enable the dialysis machine to operate in the non-treatment or bypass mode, the dialysis machine in FIG. 2 recirculates the dialysis fluid through a recirculation container or jug 66 via recirculation lines 68a and 68b. The recirculation helps to further mix the dialysis fluid and allows the fresh dialysis fluid pump to run continuously even if a dialysis fluid container or bag is not currently being filled. Recirculation container or jug 66 and recirculation lines 68a and 68b may be reused over multiple days, e.g., thirty days, or be discarded and replaced along with a tubing set 70 discussed next.

Figure 3:
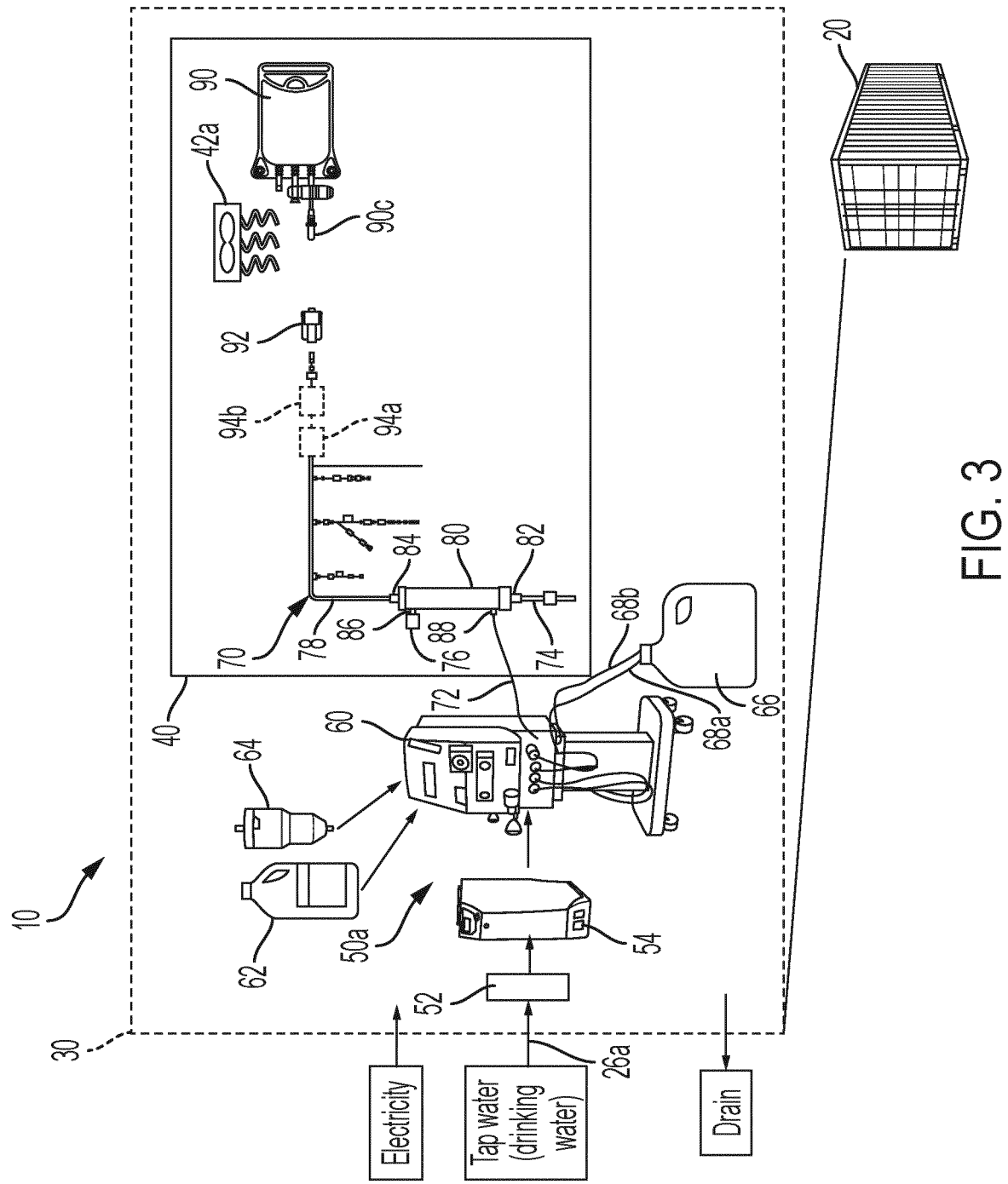
FIG. 3 is a front elevation view illustrating an expanded portion of one embodiment for a mobile dialysis fluid generation system of the present disclosure in more detail.

Referring additionally to FIG. 3, which shows the disposable portion of system 10 in more detail, system 10 includes tubing set 70. Tubing set 70 includes a dialysis fluid line 72, a clamped line 74, a cap 76 and an outlet line 78. Each of lines 72, 74, 76 and 78 may be a flexible tube. Dialysis fluid line 72 leads from mixing device 60 to a filter or dialyzer 80. Filter or dialyzer 80 includes a first inner compartment (inside of hollow fiber membranes) connector 82, a second inner compartment connector 84, a first outer compartment (outside of hollow fiber membranes) connector 86 and a second outer compartment connector 88. FIGS. 2 and 3 illustrate that first outer compartment connector 86 is blocked or capped via cap 76. Dialysis fluid line 72 extends to and connects to second outer compartment connector 88. Clamped line 74 connects to first inner compartment connector 82 and is clamped via a clamp to block first inner compartment connector 82. In an alternative embodiment, clamped line 74 is replaced with a cap that caps first inner compartment connector 82. Outlet line 78 connects to second inner compartment connector 84 and extends to the laminar flow area created by laminar flow fans 42a, 42b of laminar flow hood 40.

Outlet line 78 connects to a dialysis fluid container or bag 90 via a connector 92, e.g., a luer or other medically suitable threaded connector, which connects to a mating connector 90c of container or bag 90. Depending on the type of bag connector 90c, an adapter (not illustrated) may be needed to interface between outlet line connector 92 and bag connector 90c. For example, the adapter may include a female luer end that connects to the male luer configuration of outlet line connector 92 and a bag connector end that is of a type configured to mate with bag connector 90c. In any embodiment described herein having connector 92, it is to be assumed that such an adapter is also provided if needed. In any case, the outlet line connector 92 to bag connector 90c connection is made within the laminar flow area created by laminar flow fans 42a, 42b of laminar flow hood 40. Any portion or all of tubing set 70, including dialysis fluid line 72, clamped line 74, cap 76, outlet line 78, dialyzer 80 and connector 92 may be made of one or more plastic, e.g., polyvinylchloride ("PVC") or a non-PVC material, such as polyethylene ("PE"), polyurethane ("PU") or polycarbonate ("PC"). Tubing set 70 is used for a single filling session, e.g., for one day, one production shift, or for the time it takes to make a predefined number of filled dialysis fluid container 90, e.g., fifty containers, etc. After this time or production number, tubing set 70 is discarded and replaced.

A separate container or bag 90 is used for each fill, so if a filling session includes two-hundred fills, then two-hundred containers 90 are consumed. Containers 90 may be made of any of the materials discussed above. Containers 90 in an embodiment are provided preprinted or pre-labeled and presterilized. Alternatively, labels are added as discussed in more detail below. Containers 90 are provided to hold a desired amount of dialysis fluid, such as one, two, four, five or six liters.

As discussed above first inner compartment connector 82 and first outer compartment connector 86 are blocked, while second inner compartment connector 84 and second outer compartment connector 88 are connected to outlet line 78 and dialysis fluid line 72, respectively. Fresh dialysis fluid as illustrated in FIGS. 2 and 3 is accordingly pumped into the dialysis fluid side of dialyzer 80 at one end of the dialyzer, through the micropores of the hollow fiber membranes of the dialyzer, up through the insides of the hollow fiber membranes, and out of the inner compartment (inside hollow fiber membranes) side of dialyzer 80 at the other end of the dialyzer. Dialyzer 80 in this manner further filters and purifies the dialysis fluid prior to delivery to container or bag 90.

It should be appreciated that second inner compartment connector 84 and second outer compartment connector 88 may be blocked instead, while first inner compartment connector 82 and first outer compartment connector 86 are connected instead to dialysis fluid line 72 and outlet line 78, respectively. In a further alternative embodiment, fresh dialysis fluid is instead pumped into the inner compartment side (inside hollow fiber membranes) of dialyzer 80 at one end of the dialyzer via one of connectors 82 or 84, through the micropores of the hollow fiber membranes of the dialyzer, up or down through the outsides of the hollow fiber membranes and out of the dialysis fluid side or outer compartment of dialyzer 80 at the other end of the dialyzer via one of connectors 86 or 88.

In the United States, CRRT may be performed via dialysis, such as hemodialysis ("HD"), in which the dialysis fluid from container 90 is pumped along the dialysis fluid side of a dialyzer used for treatment. That dialyzer provides a layer of separation between the dialysis fluid of the present disclosure and the patient's blood. Dialysis fluid used with such a dialyzer in the United States therefore does not have to be purified to an injectable quality. FIG. 3 illustrates an alternative embodiment in which one or more finishing or sterile sterilizing grade filters 94a, 94b (shown in phantom as optional) is/are located along outlet line 78, e.g., just upstream from connector 92. Terminal or sterile sterilizing grade filters 94a and 94b may be pass-through filters that do not have a reject line. Pore sizes for the sterile sterilizing grade filters 94a and 94b may, for example, be less than a micron, such as 0.1 or 0.2 micron. Suitable sterile sterilizing grade filters 94a and 94b may, for example, be Pall IV-5 or GVS Speedflow filters, be Yukon3 filters, or be filters provided by the assignee of the present disclosure. In an embodiment, only one upstream or downstream sterile sterilizing grade filter 94a or 94b is needed to produce injectable quality dialysis fluid. Nevertheless, two sterile sterilizing grade filters 94a and 94b may be provided for redundancy in case one fails. The injectable quality dialysis fluid may be termed replacement fluid or substitution fluid and may be used for direct injection into the arterial and/or venous blood lines to perform a hemofiltration ("HF") or hemodiafiltration ("HDF") form of CRRT, which is common in Europe.

Figure 4:
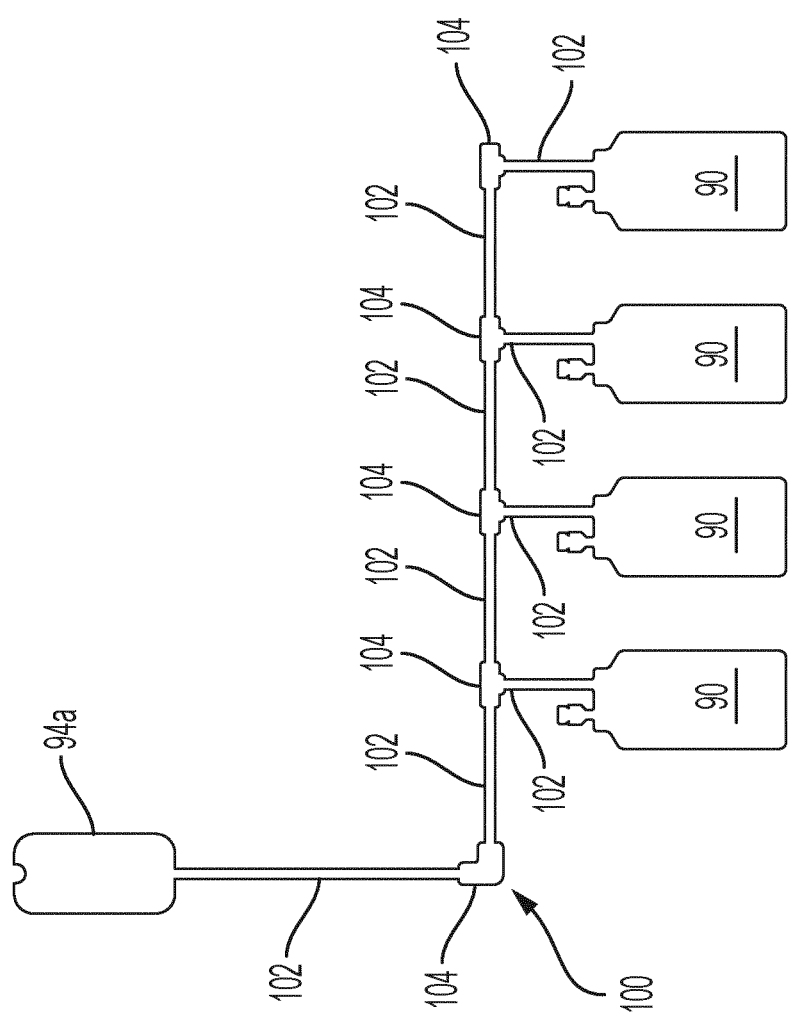
FIG. 4 is a plan view of one embodiment for a dialysis fluid container manifold having a dedicated terminal or sterile sterilizing grade filter useable with the mobile dialysis fluid generation system of FIGS. 1 to 3.

FIG. 4 illustrates an alternative embodiment in which a single terminal or sterile sterilizing grade filter 94a is provided with a manifold 100. Manifold 100 places terminal or sterile sterilizing grade filter 94a upstream from a plurality of ganged containers or bags 90 connected via short tubing segments 102 and connectors 104. Sterile sterilizing grade filter 94a is accordingly used only for the ganged number of containers or bags 90 of manifold 100, e.g., four, after which the individual tubing segments 102 to containers 90 are sealed and cut, while terminal filter 94a is discarded along with tubing segments 102 and connectors 104. In this manner terminal filter 94a may be sized and/or selected to match the expected biological load provided by the amount of dialysis fluid needed to fill the ganged number of containers or bags 90. After filling, the terminal filter 94a may be tested for filter integrity to confirm it has maintained sterilizing capability/integrity during the filling process. It is contemplated to sterilize terminal filter 94a, tubing segments 102, connectors 104 and containers 90 together at once, e.g., via gamma or other radiation, ethylene oxide or steam sterilization. The rest of system 10 is provided and maintained as described in FIGS. 1 to 3. The ganged containers or bags 90 may be filled simultaneously or one at a time using any of the volume or weight control structures described herein. Once filled with dialysis fluid, containers or bags 90 are closed and separated for storage. Although not illustrated, it is contemplated to place a sample container along manifold 100, e.g., at the end of the manifold, which is removed when the manifold is filled and separated for storing containers 90. The sample container allows the additionally sterilized fluid in manifold 100 to be tested to confirm that it is appropriate for HF or HDF.

Figure 5:
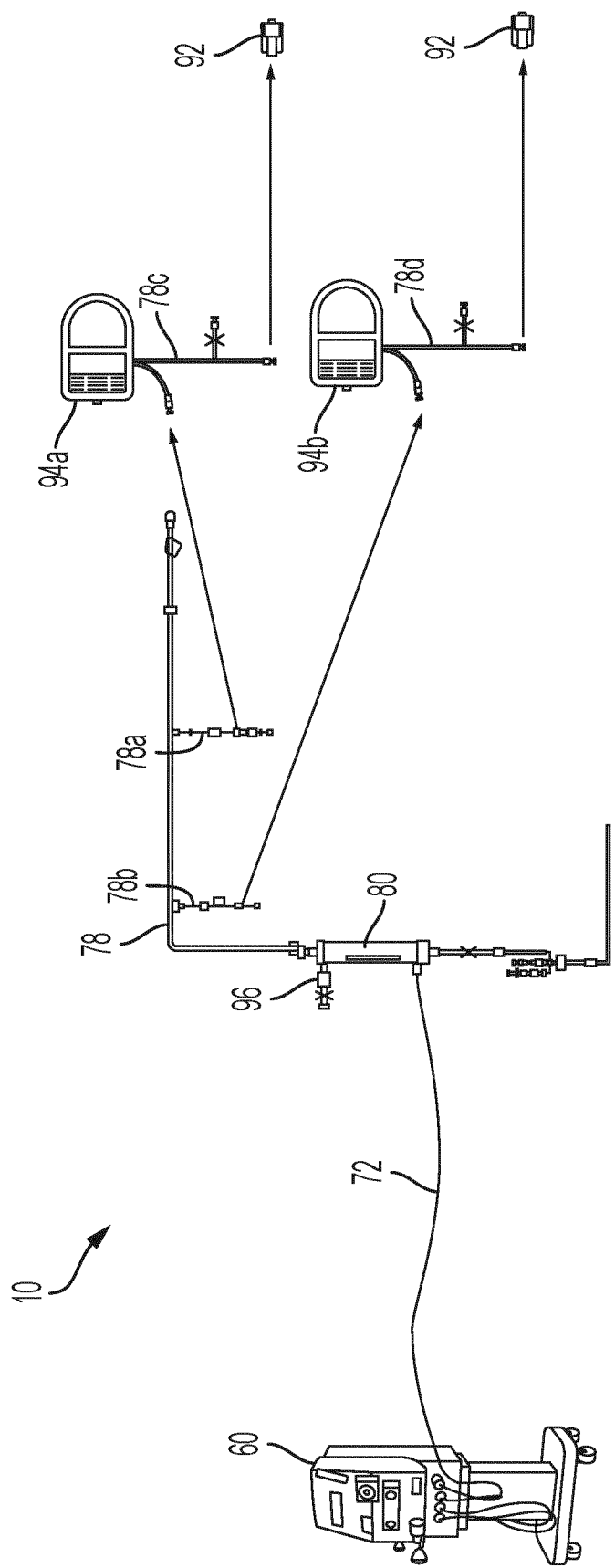
FIG. 5 is a front elevation view of another embodiment for a mobile dialysis fluid generation system of the present disclosure having multiple parallel inline filtration lines or pathways.

FIG. 5 illustrates an alternative embodiment for system 10. As mentioned above, a dialyzer shown in FIG. 5 is one possibility for filter 80 of system 10. Filter 80 of system 10 may alternatively include a different structure, such as a hemofilter or ultrafilter. One suitable ultrafilter is a U8000S Ultrafilter, which is provided by the assignee of the present disclosure. Ultrafilters have less ports or connections than do dialyzers and thus may only need to have a single reject port blocked, e.g., capped or clamped. Ultrafilters are also designed for the type of filtration and purification needed for system 10. In particular, ultrafilters are designed and tested for one-way dead end filtration, as opposed to dialyzers, which are designed and tested for primarily diffusive exchange across countercurrent blood/dialysate flow. It is accordingly one preferred embodiment that ultrafilters be used if possible for system 10, however, dialyzers may be used for example if ultrafilters are not currently available.

System 10 in FIG. 5 includes mixing device 60, which may be a dialysis machine outputting dialysis fluid via dialysis fluid line 72 to ultrafilter 80 (water purification equipment 52, 54, concentrates 62, 64, recirculation container or jug 66 and recirculation lines 68a and 68b are provided but not illustrated in FIG. 5). The reject port of filter 80 is capped via a cap 96. Output line 78 extends from ultrafilter 80. An additional difference with system 10 of FIG. 5 is that output line 78 in FIG. 5 includes two branches 78a and 78b, which connect to filters 94a and 94b, respectively. Exit lines 78c and 78d extend from sterile sterilizing grade filters 94a and 94b, respectively, to connectors 92, which attach to container 90.

Parallel branches 78a and 78b and filters 94a and 94b allow the filters to share, e.g., halve, the bioburden provided by the dialysis fluid flowing through filter 80. Additionally, the branching of the flow into two filtration paths as illustrated in FIG. 5 reduces the backpressure across each filter 94a and 94b, which helps to prevent overpressure alarms at mixing device 60. While two branches 78a and 78b and filters 94a and 94b are illustrated, output line 78 may instead include three or more branches and filters 94a . . . 94n. Filters 94a . . . 94n as discussed herein purify the dialysis fluid to a level that it may be used as substitution or replacement fluid for HF or HDF.

Figure 6:
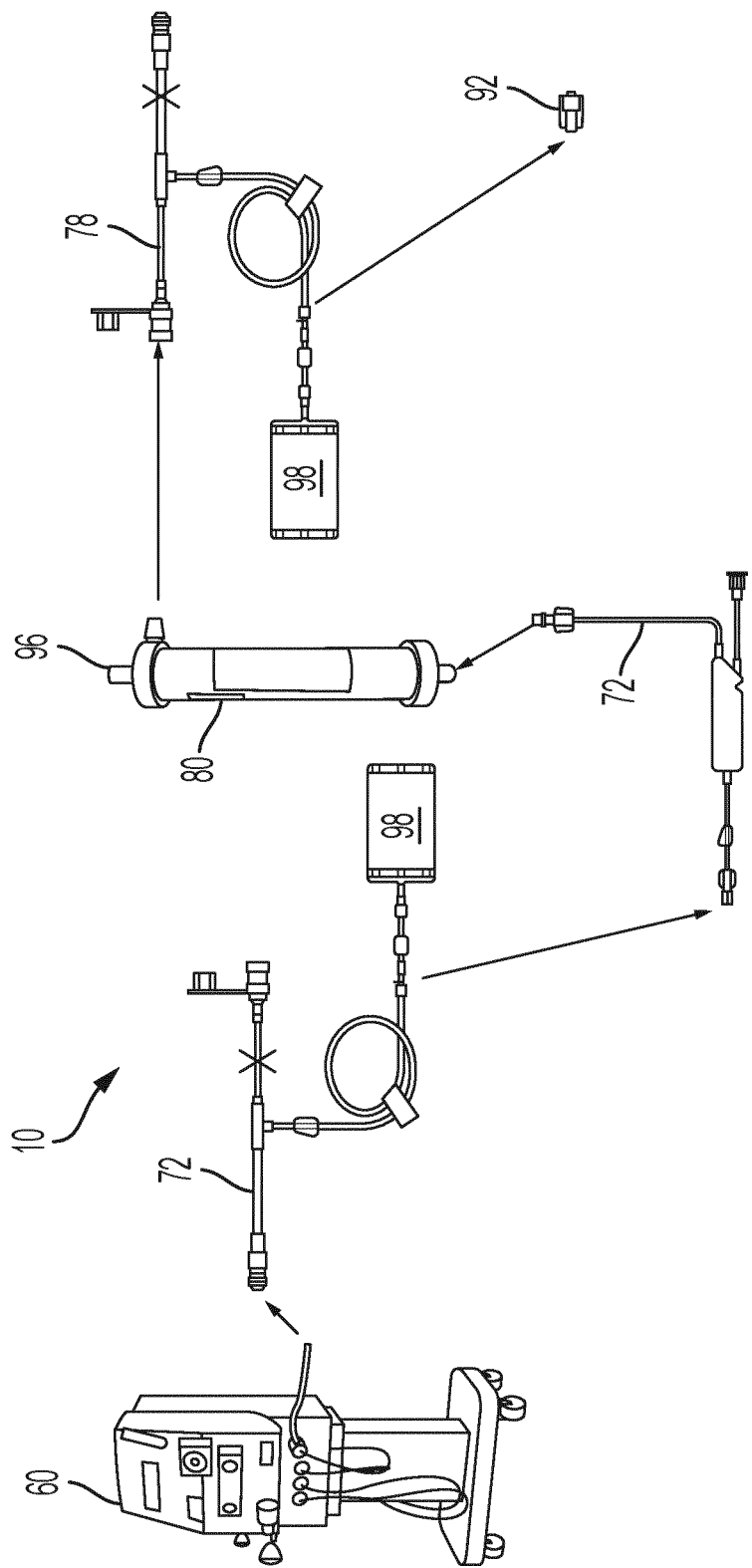
FIG. 6 is a front elevation view of another embodiment for a mobile dialysis fluid generation system of the present disclosure having multiple sample ports and containers.
Figure 8A:
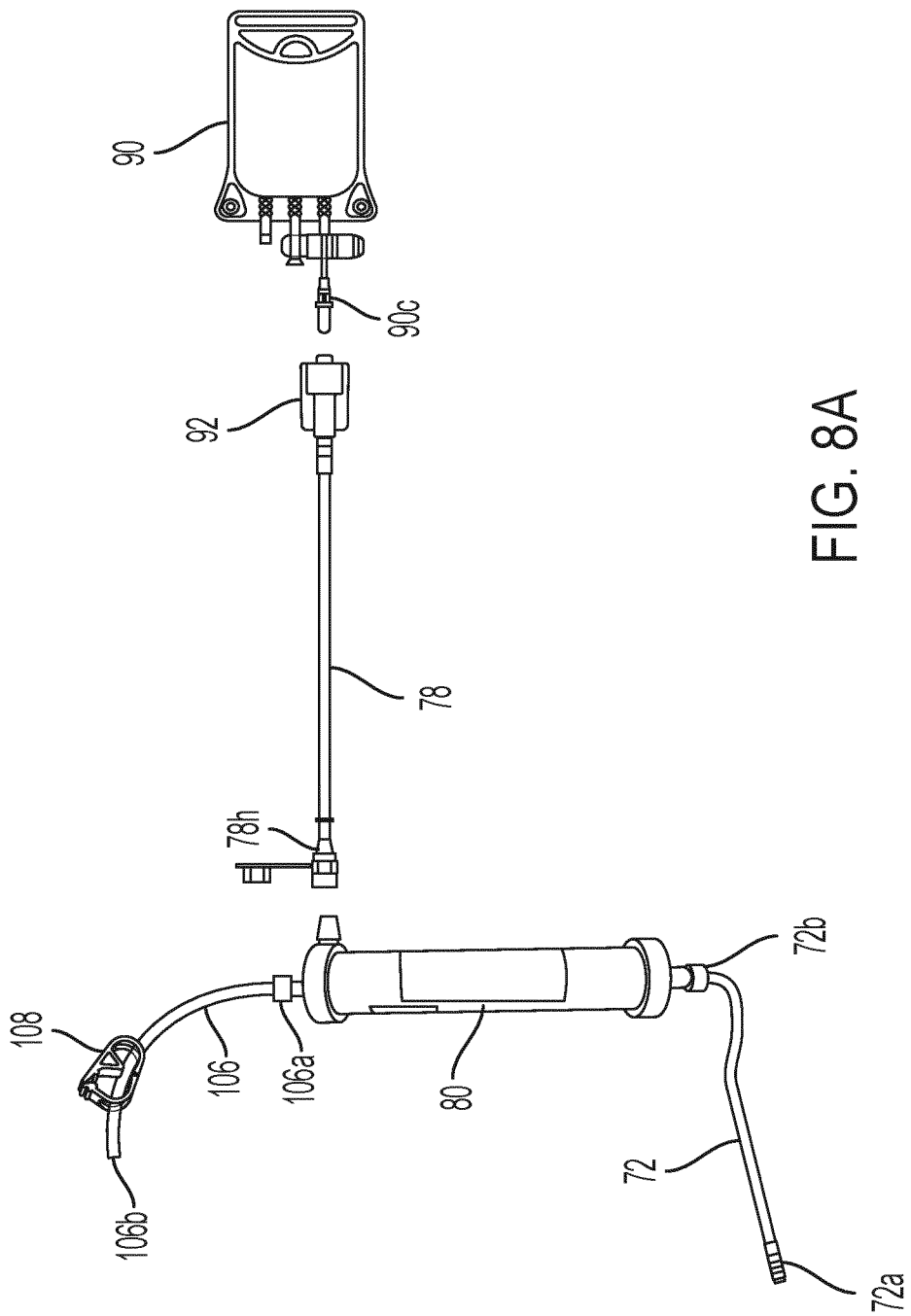
FIG. 8A is a plan view of an alternative solution of the present disclosure in which an ultrafilter and connecting lines, adapter and presterilized dialysis fluid containers are provided to a hospital or clinic for use with one of their dialysis machines.

FIG. 6 illustrates a further alternative embodiment for system 10. System 10 of FIG. 6 includes an ultrafilter 80, such as a U8000S Ultrafilter. System 10 in FIG. 6 includes mixing device 60, which may be a dialysis machine outputting dialysis fluid via dialysis fluid line 72 to ultrafilter 80 (water purification equipment 52, 54, concentrates 62, 64, recirculation container or jug 66 and recirculation lines 68a and 68b are provided but not illustrated in FIG. 5). The reject port of ultrafilter 80 may be capped via a cap 96 as illustrated or be connected to a length of tubing, e.g., 1.5 meters long or less, as illustrated in FIG. 8A for allowing ultrafilter 80 to be primed, after which the length of tubing is clamped closed. In FIG. 6, either one or both of dialysis fluid line 72 or output line 78 may be connected initially to a sample container or bag 98. Sample containers 98 allow the dialysis fluid pre- and post-ultrafilter 80 to be tested to confirm at least one of (i) water purifier 54 and the water purification equipment are operating properly via upstream sample container or bag 98 and/or (ii) the dialysis fluid post-ultrafilter 80 is sufficiently purified for treatment via downstream sample container or bag 98. After sample containers or bags 98 are filled, they are removed for analysis. As shown in FIG. 6, an adapter portion of line 72 is then connected to complete dialysis fluid line 72 leading to the inlet of ultrafilter 80, while a connector 92 is connected to where sample container or bag 98 has been removed, wherein connector 92 enables attachment to one or multiple containers 90.

While FIG. 6 illustrates sample containers or bags 98 as being optional connections for connecting to dialysis fluid line 72 or output line 78, lines 72 and 78 may alternatively provide a T or Y-connector for connecting to the sample containers 98, which allows sample containers or bags 98 to be unclamped and used when desired and also to be sterilized along with the rest of the tubing set. Sample containers or bags 98 and the associated tubing and connectors discussed herein may be provided with any version of system 10 described herein.

For any of the above versions of system 10, mixing device 60, e.g., a dialysis fluid machine, may include volume control structure that enables a predefined volume or weight of dialysis fluid to be delivered into container 90. For example, mixing device 60 may include one or more flowmeter whose output is integrated to deliver a known and repeatable volume of dialysis fluid to container 90. In another embodiment, a volumetric control device, such as a balance chamber, is used. It is also contemplated for the control unit of mixing device 60 to count known volume strokes of a peristaltic pump, such as a blood pump of a dialysis machine. While peristaltic pumping is not considered to be particularly accurate, it may be accurate enough for the present purpose, which is to fill container 90. There may be no harm if the volume of dialysis fluid filled into container 90 is off by a few milliliters. If greater accuracy is needed, however, a highly accurate pump, such as a piston or membrane pump may be provided, in which known volume pump strokes are accumulated until the desired volume is accurately reached. In further alternative embodiments mixing device 60 may include a weight scale or a volume determination using the ideal gas law to meter the desired volume container 90.

With any of the above volume control structures it is contemplated for the operator, once connector 92 is aseptically connected to container 90 under laminar air flow from laminar flow hood 40 as illustrated in FIGS. 2 and 3, to press a start button on mixing device 60. Mixing device 60 then automatically opens a valve to dialysis fluid line 72 and pumps the desired volume or weight of dialysis fluid into container or bag 90. Once the desired volume or weight of fresh dialysis fluid is delivered, mixing device 60 then automatically closes the valve to dialysis fluid line 72 to terminate the fill. The dialysis fluid pump may also be stopped, or left running to continue to recirculate the dialysis fluid via container or jug 66 and recirculation lines 68a and 68b.

Figure 7A:
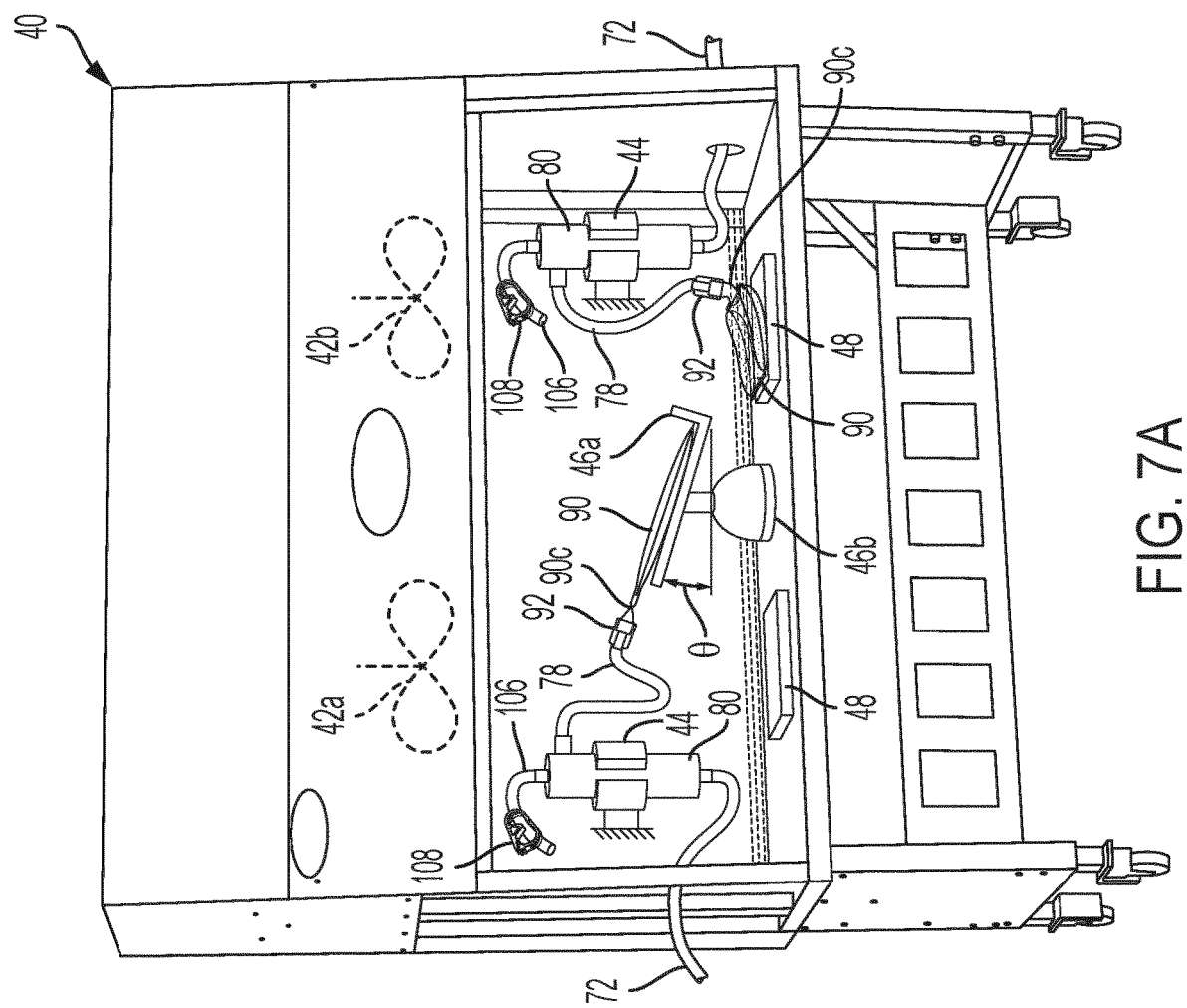
FIG. 7A is a perspective view illustrating one possible laminar flow hood useable with the mobile dialysis fluid generation system of the present disclosure.

FIG. 7A illustrates an embodiment for laminar flow hood 40. One suitable laminar flow hood 40 is provided by NuAire under the tradename AireGard ES (Energy Saver) NU-140 Vertical Laminar Flow Hood. Laminar flow hood 40 may be made of plastic or metal, e.g., steel or stainless steel. FIG. 7A illustrates that laminar flow hood 40 includes laminar flow fans 42a, 42b, which blow cleanroom and/or HEPA air at a laminar flowrate, e.g., 90 feet/minute (0.46 meters/second) across the aseptic connection between container or bag 90 and connector 92. In the illustrated embodiment, filters, e.g., ultrafilters 80, are held in place via clamps 44, which are fixed to hood 40, e.g., to a back surface or table surface of hood 40. Dialysis fluid lines 72 from mixing devices 60 extend into hood 40 and connect to the inlets of ultrafilters 80. The reject ports of ultrafilters 80 are capped via caps 96 as described herein. Outlet lines 78 from ultrafilters 80 extend into hood 40 such that connectors 92 at the end of lines 78 reach a point in the direct air flow path of fans 42a and 42b.

In the illustrated embodiment, a tilted pan 46a is located within hood 40 for supporting containers or bags 90 as line connectors 92 are connected to container connectors 90c. Tilted pan 46a is supported by a swivel base 46b, which is placed on, e.g., bolted to, the table surface inside hood 40. Tilted pan 46a is set at an angle θ, which is anywhere from 15° to 90°. Angle θ of tilted pan 46a allows bag connector 90c to point upwardly as it is connected to line connector 92, which helps to prevent dialysis fluid drips, which tend to lead to wetness and possible resulting contamination within hood 40. Swivel base 46b swivels horizontally, e.g., for a full 360°, so that container connectors 90c point to the left to connect with line connector 92 extending from filter 80 located to the left, and so that container connectors 90c point to the right to connect with line connector 92 extending from filter 80 located to the right in FIG. 7A. It should be appreciated that in an alternative embodiment, filters 80 are attached at mixing devices 60 as shown in multiple figures herein, wherein outlet lines 78 extend instead into hood 40. The teachings regarding titled pan 46a and swivel base 46b are equally applicable to this alternative.

After the connection of line connector 92 to bag connector 90c is made at titled pan 46a, the user removes the connected container or bag 90 and lays it on the table surface of hood 40 for filling. A single titled pan 46a and swivel base 46b are accordingly easily able to handle the filling of two containers or bags 90 simultaneously. In an alternative embodiment, weigh scales 48, e.g., one or more load cell(s) provided inside of a sleek and easily cleanable housing, record the weight of fluid delivered to container 90. In an embodiment, each weigh scale 48 outputs weight signals wired or wirelessly to mixing device 60 e.g., via Bluetooth, WiFi or other protocol via transceivers located within weigh scale 48 and within mixing device 60. The communication enables mixing device 60 to close a valve along dialysis fluid line 72 (or upstream from line 72) when weigh scale 48 senses that container 90 has received a desired weight of dialysis fluid. In such an embodiment, mixing device 60 is not required to have or use volume control structures such as the ones listed above. In an alternative embodiment, two titled pans 46a are provided, each dedicated to filter 80, wherein their bases 46b may be provided with weigh scales, such that separate weigh scales 48 are not needed.

It is also contemplated for any version of system 10 described herein to allow the operator to manually control the filling of containers 90. One example is for the operator to select or press a "run" switch or button at mixing device 60 to begin the fill and then start a timer, which knowing the flowrate of the dialysis fluid filling container 90, causes a desired amount of fresh dialysis fluid to be delivered to containers 90. Once the timer times out, the operator presses a "stop" or "bypass" switch or button at mixing device 60. In one embodiment, regardless of the type of volume control employed, while one container 90 is being filled, the operator connects a new unfilled container 90 to a second connector 92. A second operator may then be tasked with removing multiple dialysis fluid filled containers 90 from cleanroom 30 and moving same, e.g., to a storage rack to the right of de-gowning area 34 (or for removing containers 90 from conveyor 38 (see FIG. 1)).

Figure 7B:
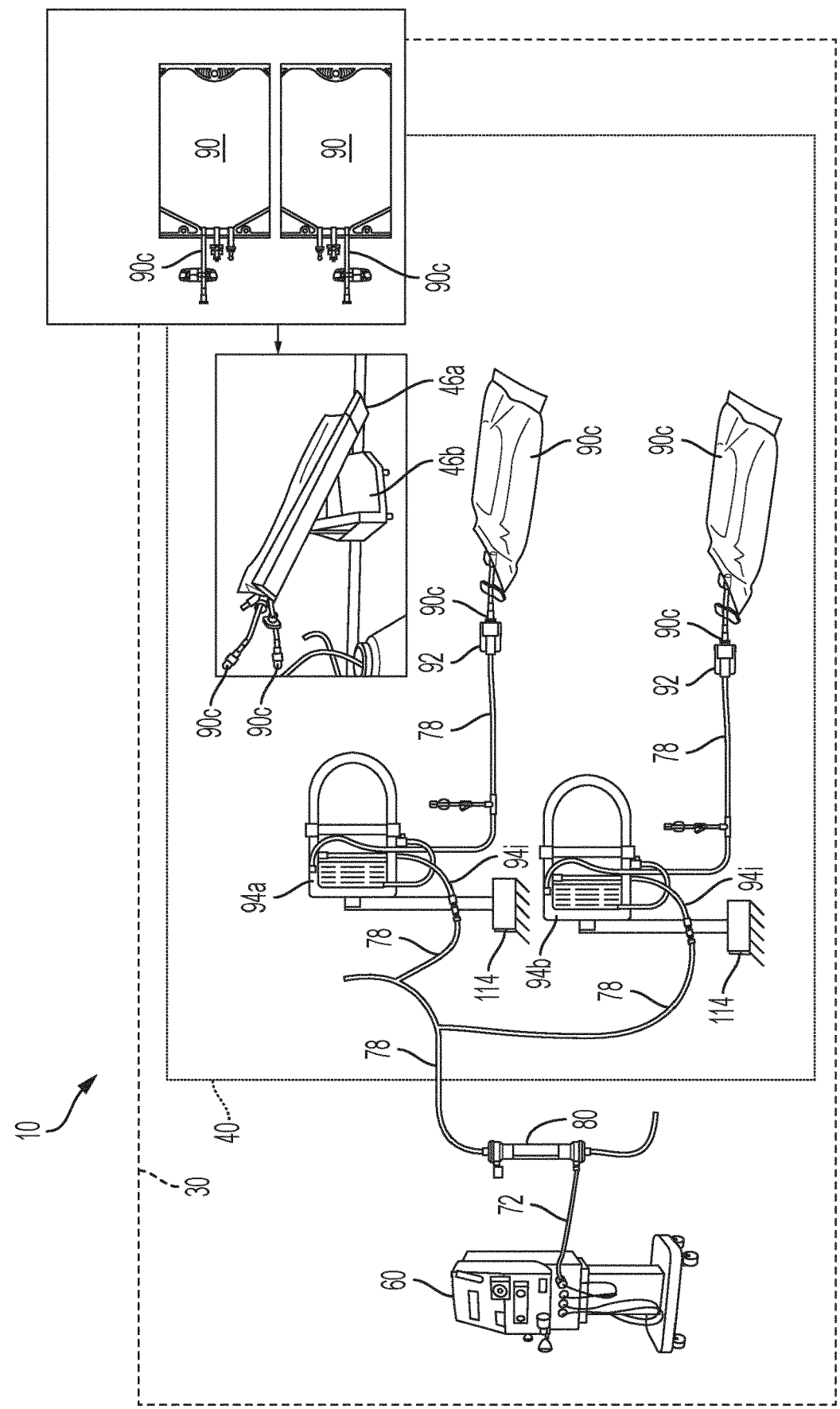
FIG. 7B is a schematic view illustrating an embodiment for providing additional filtration within a laminar flow hood useable with the mobile dialysis fluid generation system of the present disclosure.

FIG. 7B illustrates an alternative embodiment for system 10 in which mixing device 60 inside cleanroom 30 feeds dialysis fluid via dialysis fluid line 72 into a dialyzer 80 (or ultrafilter), which is located outside of laminar flow hood 40. Dialysis fluid outlet line 78 extends into hood 40 and splits into two outlet lines 78, which each connect to an inlet line 94i of a sterile sterilizing grade filter 94a and 94b. Sterile sterilizing grade filters 94a and 94b in FIG. 7B may be off the shelf blood sets having a convenient threaded connection, e.g., luer connection at the end of inlet line 94i, such that the connection between outlet lines 78 and inlet lines 94i may be a threaded, e.g., luer connection. Sterilizing grade filters 94a and 94b are fixed to mounts 114, which are in turn fixed to the table surface of hood 40. Outlet lines 78 exiting sterile sterilizing grade filters 94a and 94b holds further sterilized dialysis fluid, which exits line connectors 92 (and possibly an adapter) connected to container connectors 90c into containers or bags 90.

FIG. 7B also includes tilted pan 46a and swivel base 46b, which here may hold two containers 90c, which are stacked oppositely so that connectors 90c are separated from one another. As soon as containers 90 on the table surface are filled, as indicated or controlled via any technique described herein, outlet lines 78 are removed and connected to container connectors 90c of the containers residing on tilted pan 46a and swivel base 46b. Swivel base 46b may be rotated 180° to interface with a mirrored setup from that shown in FIG. 7B. Thus, four containers 90 may be filled at roughly the same time in FIG. 7B.

Figure 7C:
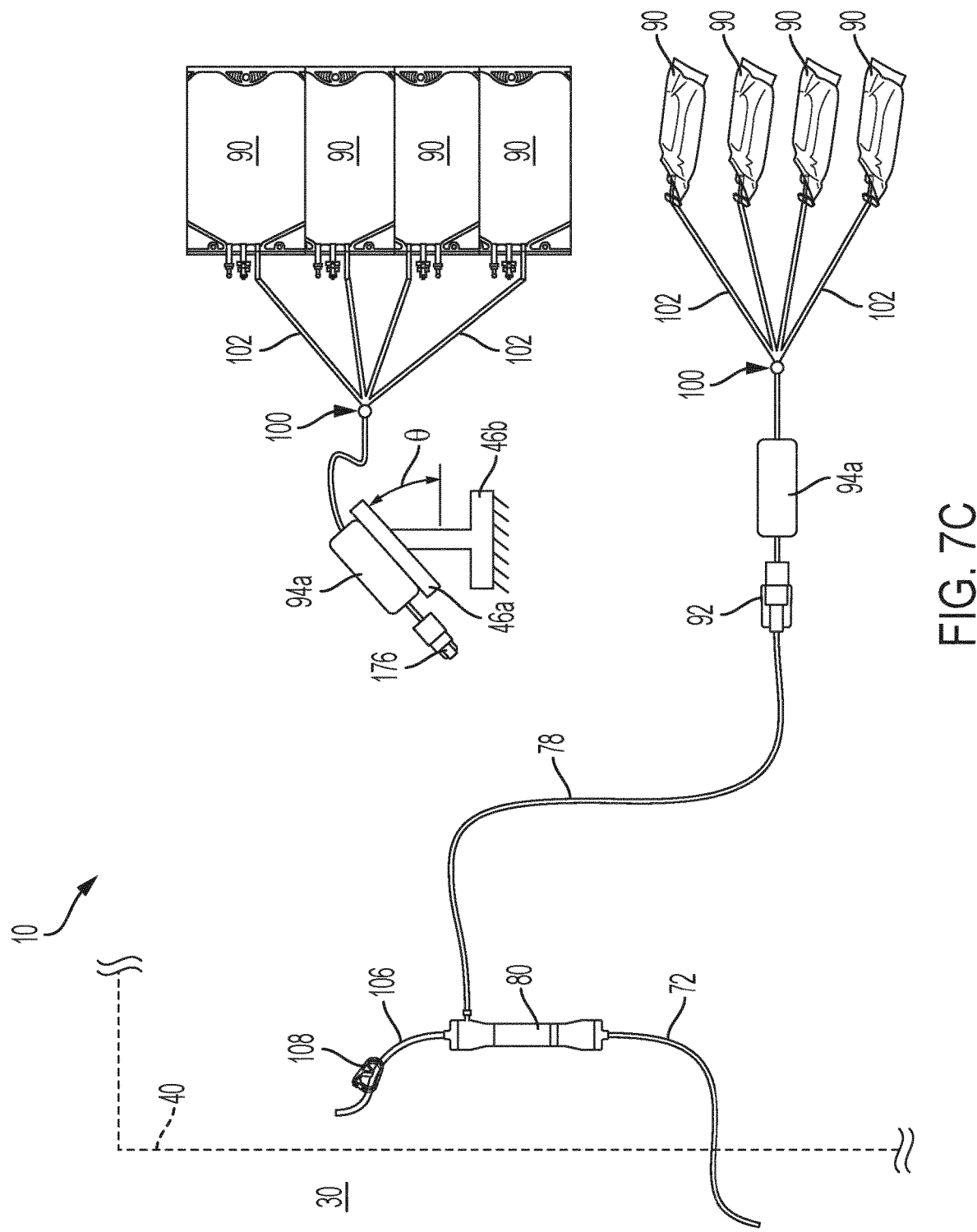
FIG. 7C is a schematic view illustrating one embodiment for integrating the manifold of FIG. 4 within a laminar flow hood useable with the mobile dialysis fluid generation system of the present disclosure.

FIG. 7C illustrates another alternative embodiment for system 10, which interfaces with manifold 100 of FIG. 4 inside hood 40, wherein mixing device 60 is located within cleanroom 30 but outside of hood 40 and ultrafilter 80 is located within hood 40. Dialysis fluid line 72 extends from mixing device 60 inside hood 40 to ultrafilter 80, to which clamped priming line 106 is connected. Dialysis fluid outlet line 78 extends from ultrafilter 80 and connects via connecter 92 to a mating connector of manifold 100 located upstream of sterile sterilizing grade filter 94a. Further sterilized dialysis fluid exits filter 94a and fills multiple, e.g., four, containers 90 in parallel. At the same time, a second sterile sterilizing grade filter 94a of a second manifold 100 is placed on tilted pan 94a angled at desired angle θ to help prevent against fluid drops or spills during connection. Second sterile sterilizing grade filter 94a connects to four additional containers 90 as illustrated, which are empty and lying on the table surface of hood 40.

As soon as the containers 90 being filled are filled to completion, as indicated or controlled via any technique described herein, outlet line 78 is removed and connected to the connector (shown as being initially capped via a cap 176) just upstream from second sterile sterilizing grade filter 94a for filling the second set of multiple containers 90. Swivel base 46b may again be rotated 180° to interface with a mirrored setup from that shown in FIG. 7C. Thus, eight containers 90 may be filled at roughly the same time in FIG. 7C. For proper filling it is contemplated to spread containers 90 out along the table surface of hood 40 as illustrated in FIG. 7C. In FIG. 7C it is also contemplated to heat seal and cut tubing segments 102 leading to containers 90, e.g., in a manner discussed in connection with 11. The heat sealing and separation may occur inside of hood 40; or manifold 100 with filled containers 90 may be pulled outside of hood for heat sealing and separation.

Figure 7D:
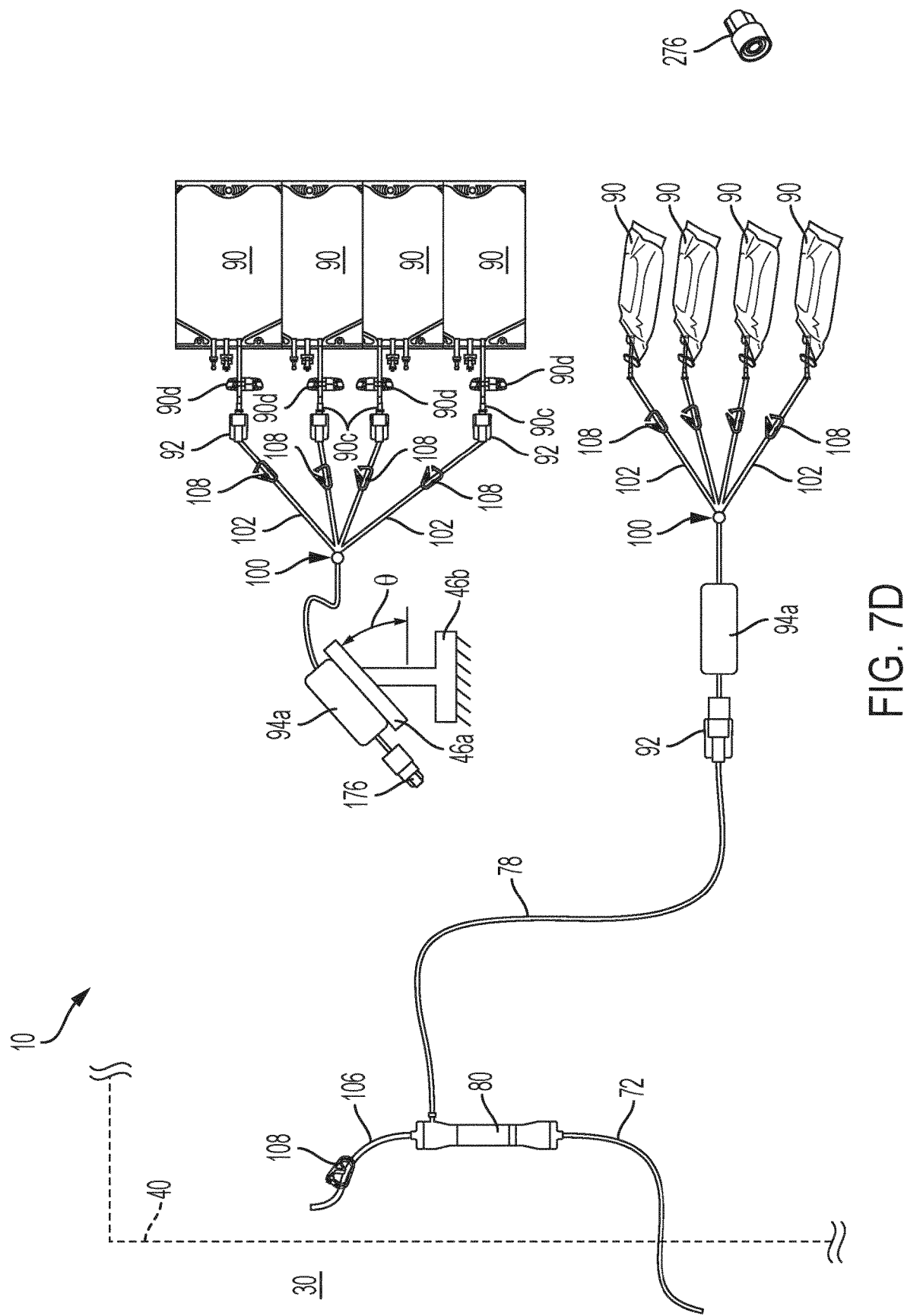
FIG. 7D is a schematic view illustrating another embodiment for integrating the manifold of FIG. 4 within a laminar flow hood useable with the mobile dialysis fluid generation system of the present disclosure.

FIG. 7D illustrates a further alternative embodiment for system 10, which again interfaces with manifold 100 of FIG. 4 inside hood 40, wherein mixing device 60 is located within cleanroom 30 but outside of hood 40 and ultrafilter 80 is located within hood 40. System 10 of FIG. 7D operates the same as that of system 10 of FIG. 7C, except for how filled containers 90 are separated from manifold 100. Containers 90 in FIG. 7D are illustrated as having built-in clamps 90d located just upstream from container connectors 90c. Tubing segments 102 of manifold 100 likewise include external mechanical clamps 108, such as Roberts™ clamps. Clamps 90d and 108 are open during filling and during the connection of outlet line 78 to sterile sterilizing grade filter 94a, which is placed on tilted tray 46a. Once containers 90 are filled, clamps 90d and 108 are closed (inside or outside of hood 40), closing tubing segments 102 and containers 90, respectively. Line connectors 92 may then be disconnected from container connectors 90c to separate containers 90 from the rest of manifold 100. A cap 276 may then be placed onto each of the open container connectors 90c. It may be desirable to at least disconnect line connectors 92 from container connectors 90c outside of hood 40 to prevent any spillage from falling onto the table surface of hood 40.

Figure 7E:
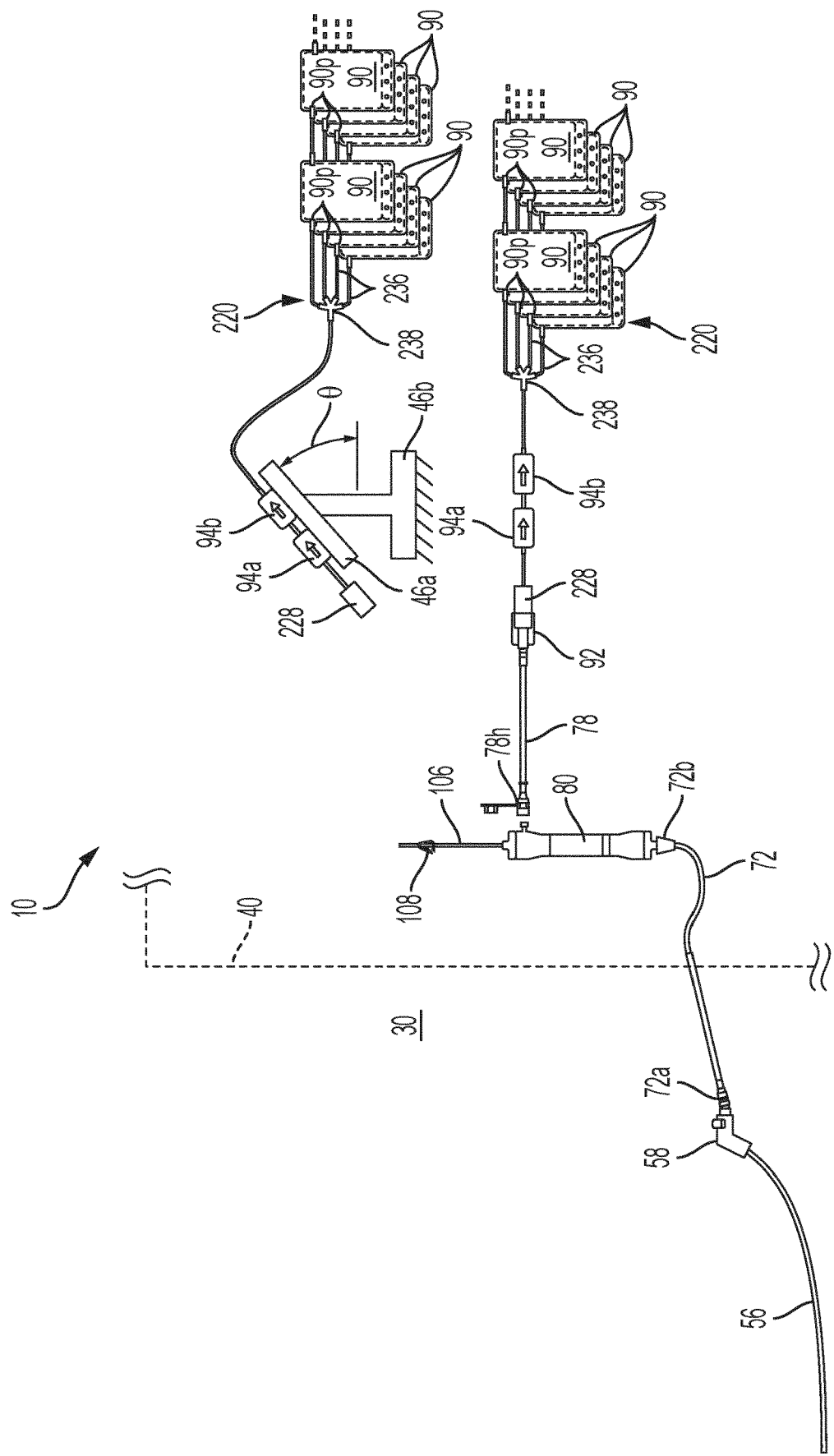
FIG. 7E is a schematic view illustrating various embodiments for integrating the tubing set of FIGS. 10A to 10C within a laminar flow hood useable with the mobile dialysis fluid generation system of the present disclosure.
Figure 10A:
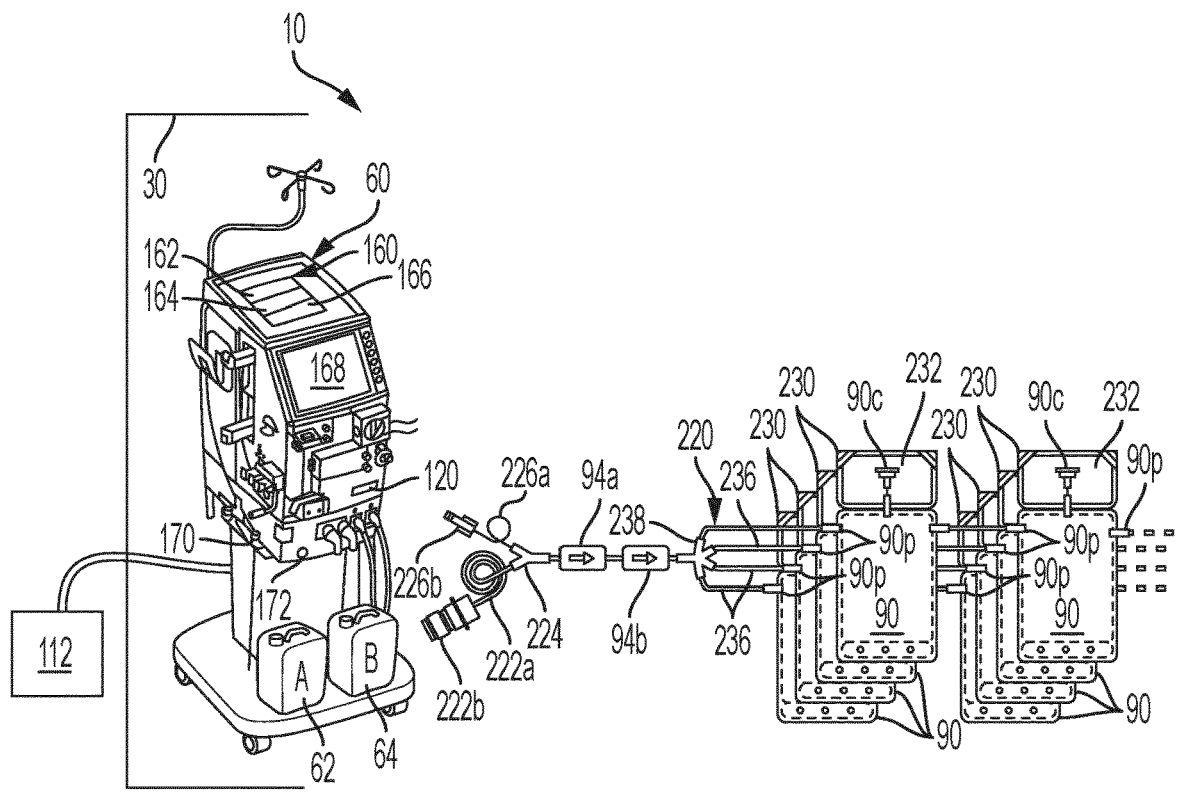
FIGS. 10A to 10C are perspective views illustrating another alternative embodiment of the system of the present disclosure in which dialysis fluid for hemodialysis ("HD"), replacement/substitution fluid for hemofiltration ("HF") and hemodiafiltration ("HDF") (CVVHD, CVVH and CVVHDF for respective continuous veno venous ("CVV") modalities), or peritoneal dialysis ("PD") is prepared and stored using an alternative dialysis machine and tubing set, which may be placed in a mobile cargo unit or "popup" cleanroom.
Figure 10B:
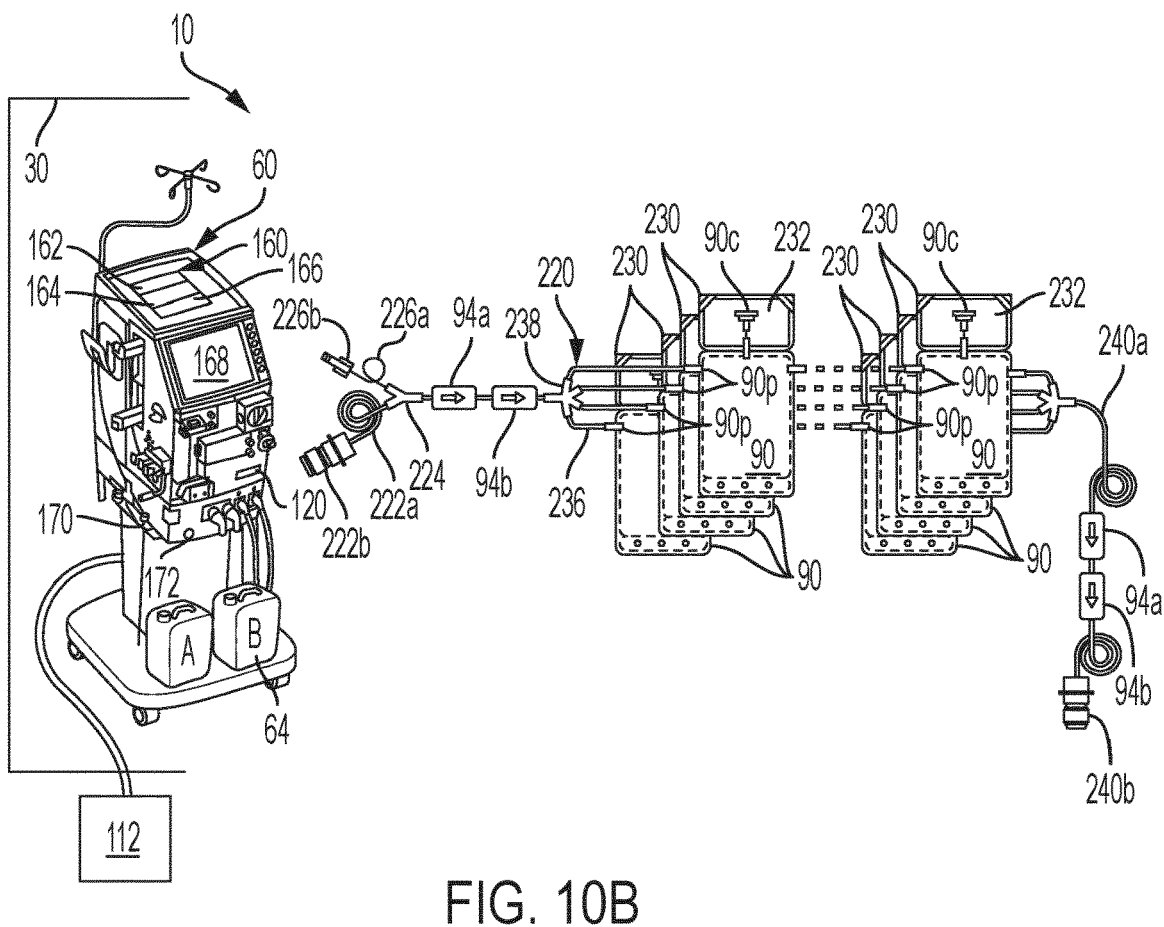
Figure 10C:
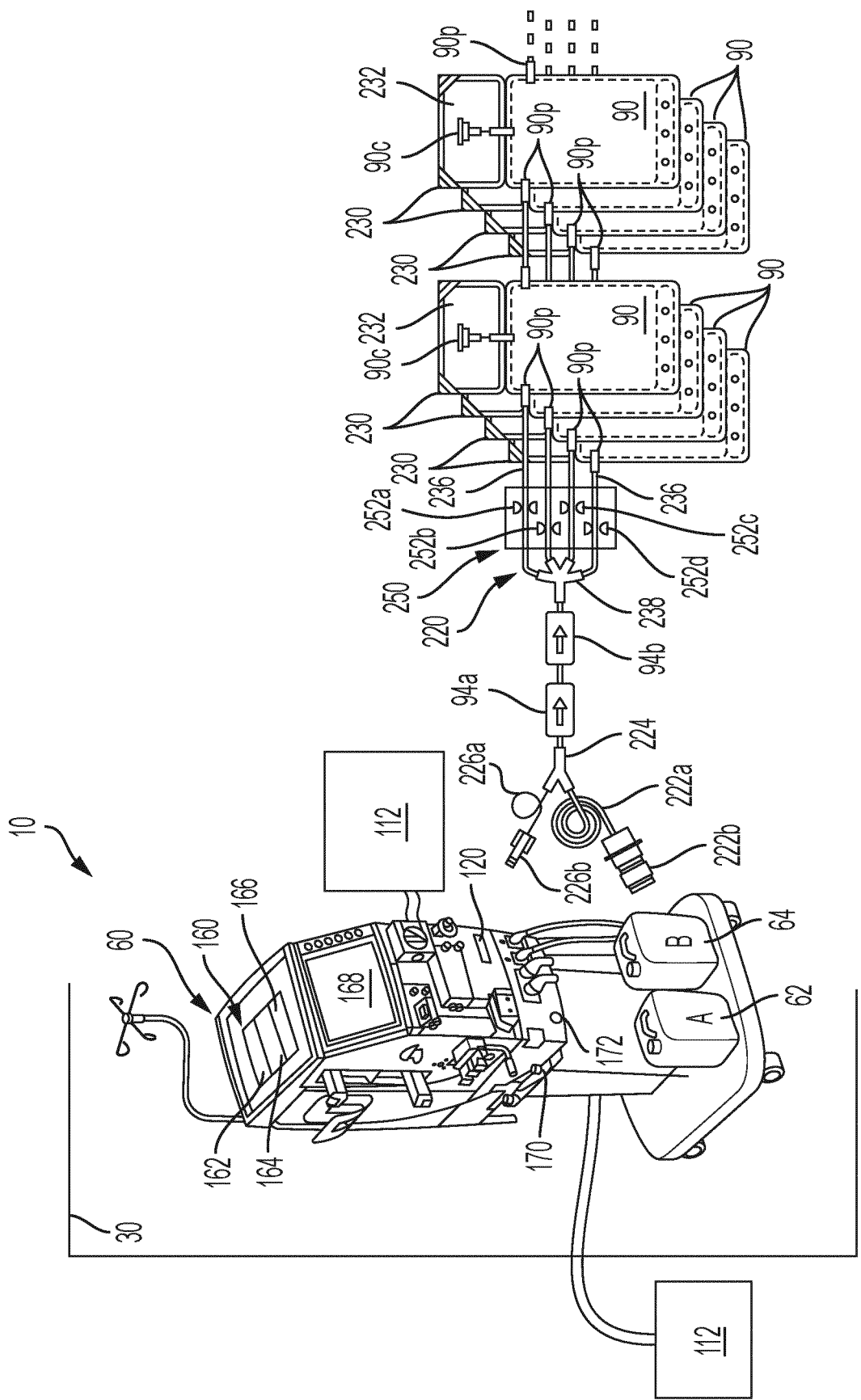

Referring now to FIG. 7E, yet another alternative embodiment for system 10 is illustrated, which interfaces with tubing set 220 of FIGS. 10A to 10C, wherein mixing device 60 is located within cleanroom 30 but outside of hood 40 and an ultrafilter 80 in one embodiment is located within hood 40. Dialysis fluid line 72 extends from a reusable line 56 of mixing device 60, e.g., a fresh dialysis fluid line of a hemodialysis machine for connecting to a dialyzer during normal operation. Dialysis fluid line 72 may include a male Hansen™ connector 72a for connecting to a reusable female Hansen™ connector 58 at the end of reusable line 56. Dialysis fluid line 72 may include a female filter connector 72b for connecting to an inlet of ultrafilter 80. Clamped priming line 106 is connected to the reject port of ultrafilter 80. Outlet line 78 may include a female Hansen™ connector 78h for connecting to an outlet port of ultrafilter 80, and a threaded or male luer connector 92 for connecting to a mating connector 228 of presterilized tubing set 220. Presterilized tubing set 220 as discussed in detail below includes one or more sterile sterilizing grade filters 94a, 94b located upstream of a plurality of ganged containers 90.

Further sterilized dialysis fluid exits the at least one filters 94a, 94b and fills multiple containers 90 in parallel and/or series. At the same time, second at least one sterile sterilizing grade filters 94a, 94b of a second tubing set 220 are placed on tilted pan 94a angled at desired angle θ to help prevent against fluid drops or spills during connection. Second at least one sterile sterilizing grade filters 94a, 94b are located upstream of multiple additional containers 90 as illustrated, which are empty and lying on the table surface of hood 40. As soon as the containers 90 being filled are filled to completion, as indicated or controlled via any technique described herein, outlet line 78 is removed and connected to connector 228 just upstream from the second at least one sterile sterilizing grade filter 94a of second tubing set 220 for filling the second set of multiple containers 90. Swivel base 46b may again be rotated 180° to interface with a mirrored setup from that shown in FIG. 7E. Thus, many containers 90 may be filled at roughly the same time in FIG. 7C. For proper filling it is contemplated to spread containers 90 out along the table surface of hood 40.

In a first alternative embodiment of FIG. 7E, ultrafilter 80 is not provided and connector 72b of dialysis fluid line 72 is replaced with threaded or luer connector 92 for direct connection with mating threaded or luer connector 228 of tubing set 220. At least one sterile sterilizing grade filters 94a, 94b are still provided to protect any downstream components from contamination due to the connection of luer connector 92 to tubing set connector 228.

In a second alternative embodiment of FIG. 7E, ultrafilter 80 and inlet line 72 are removed and tubing set connector 228 is instead a male Hansen™ connector for connecting directly to reusable female Hansen™ connector 58 of reusable machine line 56. Again, at least one sterile sterilizing grade filters 94a, 94b are still provided to protect any downstream components from contamination due to the connection of female Hansen™ connector 58 to male Hansen™ connector 228.

Referring now to FIG. 8A, an alternative product is illustrated in which an ultrafilter may be used as filter 80, which is provided along with dialysis fluid line 72, dialysis fluid outlet line 78, connector 92 (and accompanying adapter if needed) and a plurality of presterilized containers or bags 90 to a hospital or clinic. In the illustrated embodiment, a priming line 106 is connected to the reject port of ultrafilter 80, which vents air from the ultrafilter to atmosphere or to another container during priming of the ultrafilter. Priming line 106 allows filter 80 to be primed without spilling priming fluid into hood 40. After priming, priming line 106 is clamped closed via a mechanical clamp 108, such as built-in clamp or an external, e.g., Roberts™ clamp.

In one embodiment for the product of FIG. 8A, dialysis fluid line 72 is around a meter long, includes a male Hansen™ connector 72a for connecting to dialysis machine 60, and a female filter connector 72b for connecting to an inlet port of ultrafilter 80. In one embodiment, priming line 106 is 1.5 meters long or less and includes a female filter connector 106a for connecting to the reject port of ultrafilter 80 and a free end 106b that is left open to atmosphere during priming. Again, priming line 106 may have its own built-in clamp 108 or be provided with an external clamp 108 for closing line 106 after priming. In one embodiment, dialysis fluid outlet line 78 is around a meter long, includes a female Hansen™ connector 78h for connecting to an outlet port of ultrafilter 80, and a male luer connector 92 for connecting to container or bag 90 or to an adapter (not illustrated) that connects to the container or bag 90. Ultrafilter 80 may be a U8000S filter provided by the assignee of the present disclosure. If desired, a dialyzer may be used instead of an ultrafilter. In such a case the same tubing lengths and connectors described above may be employed, wherein (i) dialysis fluid line 72 is configured to connect to first inner compartment connector 82 (FIG. 3) of the dialyzer, (ii) priming line 106 is configured to connect to second inner compartment connector 84 (FIG. 3) of the dialyzer, (iii) outlet line 78 is configured to connect to first outer compartment connector 86 (FIG. 3) of the dialyzer, and (iv) second outer compartment connector 86 (FIG. 3) of the dialyzer is capped via a cap 76. The above-connections allow for a desirable inside-out flow through the dialyzer membranes.

Figure 8B:
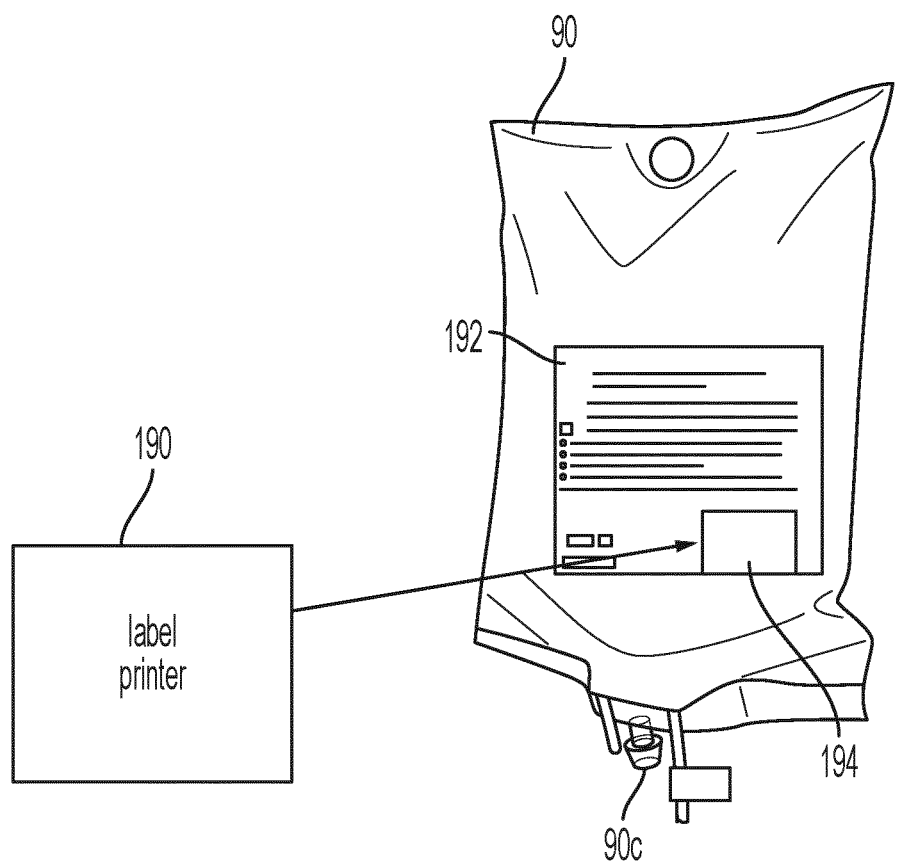
FIG. 8B is a top view of one embodiment for a dialysis fluid container or bag of the present disclosure.

Referring now to FIG. 8B, one embodiment for container or bag 90 usable with any of the systems described herein is illustrated. Container or bag 90 in the illustrated embodiment is provided with a preprinted and preaffixed label 192. That is, label 192 in an embodiment is printed and affixed onto container or bag 90 prior to delivery to cargo unit 20 or to a modular "popup" cleanroom 30. In an alternative embodiment, label 192 may be printed directly onto container 90, e.g., at the time of container formation. In any case, label 192 may include approved regulatory language, such as product composition, indications and warning information. Containers or bags 90 having preaffixed labels 192 are filled with dialysis fluid according to any of the systems discussed herein. In system 10, for example, filled containers of bags 90 having preaffixed labels 192 are then transported to the finished goods section of cargo unit 20, at which a standalone label printer 190 is provided. Label printer 190 prints a smaller, online labels 194, which may then be affixed, e.g. adhered, to a section, e.g., bare section, of preaffixed labels 192. Online labels 194 may be affixed alternatively to a separate portion of container 90. In any case, online labels 194 include instantaneous information, such as, cargo unit 20 or "popup" cleanroom 30 site information, batch number, expiration date and time, use-by time, and/or a barcode representing any of the listed instantaneous information.

Figure 9C:
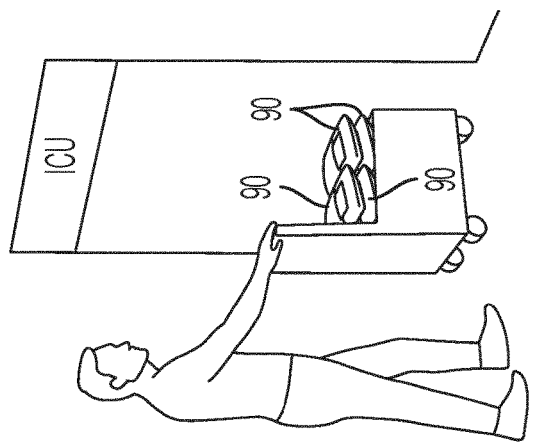
FIGS. 9A to 9C are perspective views illustrating an alternative embodiment of the system of the present disclosure in which dialysis fluid for hemodialysis ("HD"), replacement/substitution fluid for hemofiltration ("HF") and hemodiafiltration ("HDF") (CVVHD, CVVH and CVVHDF for respective continuous veno venous ("CVV") modalities), or peritoneal dialysis ("PD") is prepared and stored using an alternative dialysis machine and tubing set, which may be placed in a mobile cargo unit or "popup" cleanroom.
Figure 9B:
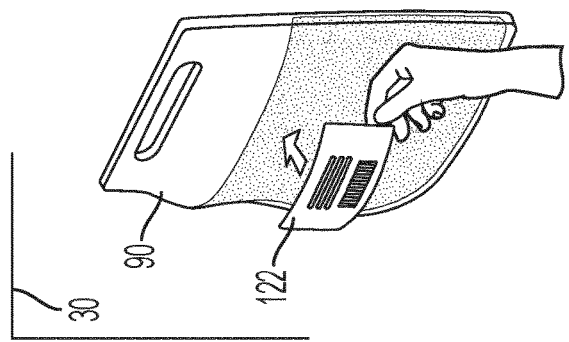
Figure 9A:
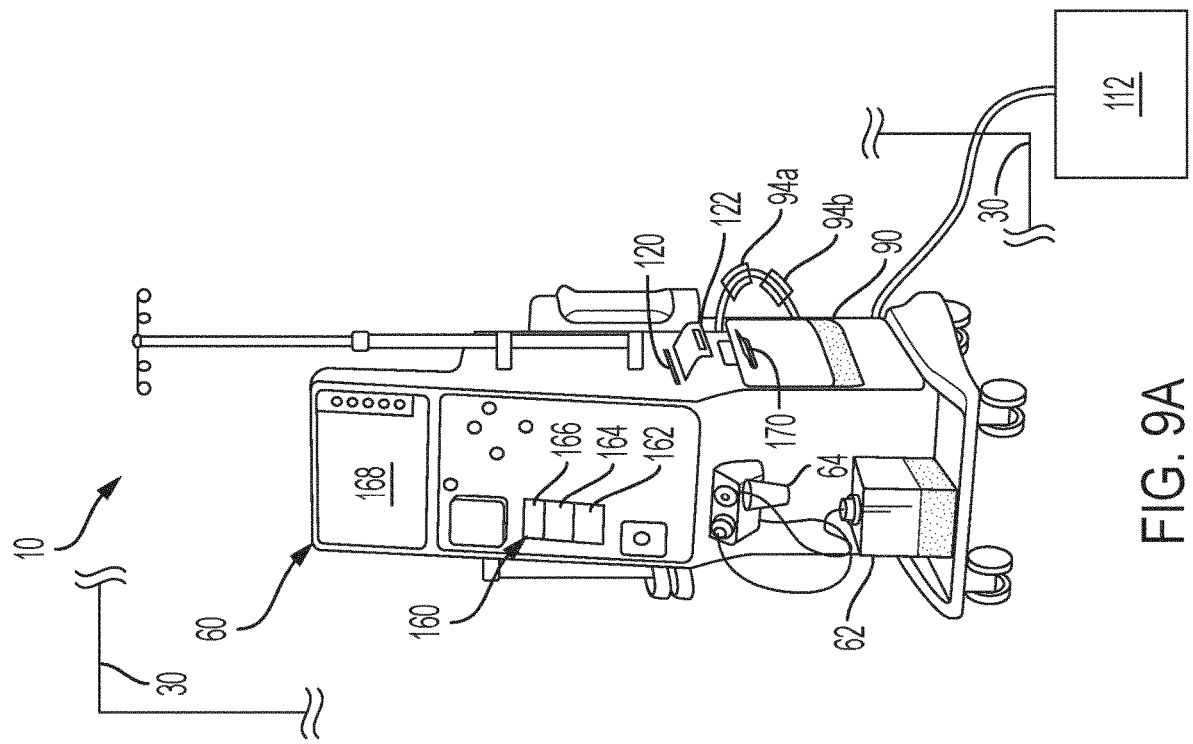

Referring now to FIGS. 9A to 9C, an alternative embodiment of system 10 of the present disclosure is illustrated for producing fluid for HD, replacement or substitution fluid for HF or HDF, PD fluid and any of the intravenous fluids discussed herein. System 10 in FIGS. 9A to 9C is useful for "popup" cleanroom 30 in the instance in which such "popup" cleanroom is provided inside a hospital, center or clinic. It should be appreciated however that any of the teachings below, including software changes at the control unit 160 of dialysis machine 60, and the associated hardware changes discussed, are equally applicable to system 10 using cargo unit 20.

FIG. 9A illustrates that system 10 may be provided as a "popup" cleanroom in a center and include a central water purification station 112 located outside cleanroom 30, which feeds dialysis machine 60 located inside cleanroom 30 (water purification equipment 52, 54 may be used inside cleanroom 30 alternatively). It should be appreciated that any of the hemodialysis machines 60 discussed herein may alternatively perform hemofiltration ("HF") or hemodiafiltration ("HDF"). Dialysis machine 60 in FIG. 9A includes all of the structures and functionalities discussed above. In particular, dialysis machine 60 includes at least one mixing pump for mixing WFD from central water purification station 112 with at least one concentrate 62, 64. Dialysis machine 60 in one embodiment includes a purified water pump that pulls WFD from central water purification station 112, such that central water purification station 112 may, but does not have to, supply its own water pressure. In an alternative embodiment, central water purification station 112 includes one or more pumps that pump WFD under positive pressure to dialysis machine 60. Here, dialysis machine 60 does not have to have a pump to pump WFD from central water purification station 112.

In any case, dialysis machine 60 includes pumps for mixing dialysis fluid and for delivering dialysis fluid from the hemodialysis machine. In one embodiment, dialysis machine 60 includes a B-concentrate pump for metering WFD through a bicarbonate cartridge 64 and adding the bicarbonate concentrated water to a mixture of liquid acid concentrate from concentrate container 62 and WFD, wherein the liquid acid is metered by and an A-concentrate pump. Conductivity cells are used in one embodiment to ensure the proper proportioning of bicarbonate concentrate with WFD and the mixture of bicarbonate concentrate and WFD with acid concentrate. The conductivity readings may be temperature compensated. Dialysis machine 60 may also include a heater, such as an inline heater. The heater may or may not be energized during the preparation of the dialysis fluid for storage in containers or bags 90. Dialysis machine 60, such as hemodialysis machine, also includes a pump for delivering fresh (possibly heated) dialysis fluid at a desired pressure and/or flowrate, e.g., the same as system 10, or 750 mm Hg or less and 300 to 800 mL/min, e.g., 500 mL/min.

It is contemplated to make hardware and software changes to an existing dialysis machine 60 for system 10. Software changes are made to a control unit 160 (also included in system 10 of FIGS. 1 to 7) of dialysis machine 60 and include, for example, establishing a dedicated container filling mode in which dialysis machine 60 runs at a specified pressure and flowrate for a known amount of time or metered amount of volume. Control unit 160 in an embodiment includes one or more processor 162, one or more memory 164 and a video controller 166 for operating with a video monitor 168 having a touch screen user interface. The filling mode in an embodiment allows for different sizes and numbers of containers 90 to be filled, e.g., by prompting the operator to enter the size of container 90, e.g., one, two, four, five or six liters, and to enter the number of containers 90 to be filled in the filling sequence (one container or multiple ganged containers). From there, dialysis machine 60 calculates how much dialysis fluid is to be prepared for the next batch or filling sequence and delivers same to a tubing set, which includes one or more container 90, any tubing and connectors connecting two or more containers 90, and in one embodiment one or more terminal or sterile sterilizing grade filters 94*a*, 94*b* provided upstream of the containers, as has been discussed herein.

The software updates may also include a confirmation in the filling mode from the operator that a filled one or more container 90 has been removed from dialysis machine 60 and that a new, empty and presterilized tubing set including one or more container 90 and possibly one or more terminal or sterile sterilizing grade filters 94*a*, 94*b* have been loaded onto the machine. The confirmation may also ask the operator to confirm the number and volume of containers 90 of the new tubing set. Once confirmed, dialysis machine 60 in the filling mode enables the operator to press "start" to begin the next filling sequence.

Software updates may also include any updates needed to cause a label to be printed having the date and time that the dialysis fluid is prepared and stored along with a required expiration duration or time, the type or formulation of the dialysis fluid, the quantity of the dialysis fluid, and other desired information, e.g., machine identification that prepared the dialysis fluid, operator identification, lot number, etc. Hardware changes include, for example, the provision of a label printer 120 as illustrated in FIG. 9A, which prints a label 122 having the above information during or at the end of a filling sequence. FIG. 9B illustrates the operator adhering label 122 onto a filled dialysis fluid container 90 (e.g., onto preprinted and preaffixed label 192 of container 90 discussed in connection with FIG. 8B). When multiple containers 90 are ganged and filled during the same filling sequence, label printer 120 under control of the updated software prints the required number of labels 122. In an alternative embodiment, label printer 120 may be provided separate from dialysis machine 60 and be operated separately by the operator.

Hardware changes may also include the provision of a hanger or holder 170 positioned and arranged to hang or otherwise hold one or more container 90 of dialysis fluid.

FIG. 9C illustrates that when a lot or batch of containers 90 filled with dialysis fluid is completed, the operator transports the lot to an intensive care unit ("ICU") for CRRT or other desired location for storage until needed. System 10 of FIGS. 9A to 9C enables dialysis for hemodialysis ("HD"), or replacement/substitution fluid for hemofiltration ("HF") and hemodiafiltration ("HDF") (CVVHD, CVVH and CVVHDF respectively for corresponding continuous veno venous ("CVV") modalities) to be prepared onsite within "popup" cleanroom 30, which reduces both delivery cost and delivery time.

Referring now to FIGS. 10A to 10C, another alternative embodiment of system 10 of the present disclosure is illustrated for producing dialysis fluid for HD, replacement or substitution fluid for HF or HDF, PD fluid, or any of the intravenous fluids discussed herein. System 10 of FIGS. 10A to 10C is also useful for a "popup" cleanroom 30 provided in the hospital, center or clinic. It should be appreciated however that any of the teachings discussed in connection with FIGS. 10A to 10C, including the filling of multiple containers 90 at once, are equally applicable to system 10 using cargo unit 20. FIGS. 10A to 10C illustrate that a central water purification station 112 may be located outside cleanroom 30, which feeds dialysis machine 60 located inside cleanroom 30 (water purification equipment 52, 54 may be used alternatively). Dialysis machine 60 in FIGS. 10A to 10C includes all of the structure and functionality discussed above. In particular, dialysis machine 60 includes at least one mixing pump for mixing WFD from central water purification station 112 with at least one FD concentrate 62, 64. Dialysis machine 60 in one embodiment includes a purified water pump that pulls WFD from central water purification station 112, such that central water purification station 112 may, but does not have to, supply its own water pressure. In an alternative embodiment, central water purification station 112 includes one or more pump that pumps WFD under positive pressure to dialysis machine 60. Here, dialysis machine 60 does not have to have a pump to pump WFD from central water purification station 112.

In any case, dialysis machine 60 includes pumps for mixing hemodialysis fluid or replacement/substitution fluid and for delivering such fluid the hemodialysis machine in the same manner as described above in FIG. 9A. In one embodiment, dialysis machine 60 includes a first concentrate pump for metering A-concentrate or acid and a second concentrate pump for metering WFD through a B-concentrate or bicarbonate cartridge. One or more conductivity cell is/are used in one embodiment to ensure the proper proportioning of the A- and B-concentrates with WFD. The conductivity readings may be temperature compensated. Dialysis machine 60 may also include a heater, such as an inline heater. The heater may or may not be energized during the preparation of the dialysis fluid for storage in containers or bags 90. Dialysis machine 60 also includes a pump, e.g., the fresh dialysis fluid pump of the machine, for delivering fresh (possibly heated) dialysis fluid at a desired or settable pressure and/or flowrate, e.g., 750 mm Hg or less and 300 to 800 mL/min, e.g., 500 mL/min. The pressure depends on the length of the overall tubing leading to containers 90, wherein the containers do not add significantly to the required pressure until becoming full. Sterile sterilizing grade filters 94*a*, 94*b* add significantly to pressure drop and are therefore sized and numbered so as to provide an overall pressure drop that is within the capability of dialysis machine 60, e.g., 750 mm Hg or less.

It is contemplated to make any of the hardware and software changes to dialysis machine 60 described above here for system 10 of FIGS. 10A to 10C. Software changes are made again to a control unit 160 of dialysis machine 60 and include, for example, establishing a dedicated container filling mode in which dialysis machine 60 runs at a specified pressure and flowrate for a known amount of time or metered amount of volume of dialysis fluid, such as HD fluid. The filling mode in an embodiment allows for different sizes and numbers of containers 90 to be filled, e.g., by prompting the operator to enter the size of container 90, e.g., two, four, five or six liters, and to enter the number of containers 90 to be filled in the filling sequence (one container or multiple ganged containers). From there, dialysis machine 60 calculates how much dialysis fluid is to be prepared for the next batch or filling sequence and delivers same to a tubing set, which includes one or more container 90, any tubing and connectors connecting two or more containers 90, and in one embodiment one or more terminal or sterile sterilizing grade filters 94*a*, 94*b* provided upstream of the containers, as has been discussed herein.

The software updates may also include a confirmation in the filling mode from the operator that a filled one or more container 90 has been removed from dialysis machine 60 and that a new, empty and presterilized tubing set including one or more container 90 and one or more terminal or sterile sterilizing grade filters 94*a*, 94*b* has been loaded onto the machine. The confirmation may also ask the operator to confirm the number and volume of containers 90 of the new tubing set. Once confirmed, dialysis machine 60 in the filling mode enables the operator to press "start" to begin the next filling sequence.

Software updates may also include any updates needed to cause a label to be printed having any of the information. Hardware changes may again include a label printer 120 as illustrated in FIGS. 10A to 10C. In an alternative embodiment, label printer 120 is provided separately from dialysis machine 60 (see, e.g., FIG. 8B). Hardware changes may also include the provision of a hanger or holder 170 positioned and arranged to hang or otherwise hold one or more container 90 of dialysis fluid. Hanger or holder 170 may for example be one or more safety clamp provided by dialysis machine 60.

FIG. 10A illustrates that in one embodiment, multiple containers 90 are filled with dialysis fluid in a single filling sequence. In the illustrated embodiment, containers 90 are provided as part of a large overall tubing set 220. Any portion of tubing set may be formed from any one or more plastic, e.g., polyvinylchloride ("PVC") or a non-PVC material, such as polyethylene ("PE"), polyurethane ("PU") or polycarbonate ("PC"). Tubing set 220 includes an inlet line 222a having an inlet line connector 222b. Inlet line connector 222b may be configured to connect to a dialysis fluid outlet port (not illustrated) of dialysis machine 60 or to a dialysis fluid outlet line (not illustrated) extending from dialysis machine 60. Inlet line 222a connects via a Y or T connection 224 to a pressure transmission line 226a having a pressure transmission line connector 226b. Pressure transmission line connector 226b plugs into a pressure transducer port 172 of dialysis machine 60. Fluid pressure within pressure transmission line 226a is transmitted to a pressure transducer via pressure transducer port 172.

In one embodiment, control unit 160 looks at multiple pressure readings over the course of a filling procedure to determine when containers 90 have been filled to a desired level. Here, control unit 160 may take a first pressure reading after an initial filling amount, e.g., 100 mL, of dialysis fluid is delivered to containers 90. This reading may be taking by momentarily stopping the filling so that the pressure measured is a static pressure. Then, filling is resumed and a second pressure measurement is taken immediately to record a corresponding dynamic pressure, which reflects the pressure drop of caused by tubing set 220, including sterile sterilizing grade filters 94a and 94b. Control unit 160 may then take multiple dynamic readings over time, that is, without stopping flow, to monitor how the pressure changes due a changing flow resistance provided by sterile sterilizing grade filters 94a and 94b. Control unit 160 then waits until a time when it is expected that containers 90 are becoming close to being full based on a known flowrate and total volume of containers 90 and stops flow again to take an additional static pressure reading via the pressure transducer. If a change in static pressure equals or exceeds a characteristic change known to control unit 160 to correspond to a container full condition, then the control unit stops the filling and notifies the operator that containers 90 are full and ready to be removed. If a change in static pressure does not equal or exceed a characteristic change known to control unit 160 to correspond to a container full condition, then the control unit resumes filling either for a preset period of time, or for a calculated period of time expected to meet or exceed the characteristic change in static pressure. Control unit 160 stops flow again after the preset or calculated amount of time to take an additional static pressure reading from the pressure transducer. Control unit 160 repeats the above loop until the change in static pressure equals or exceeds a characteristic change.

The above structure and method for determining a container full condition operates so that the operator does not have to enter, and control unit 160 does not have to know, the number and volume of containers 90. The filling sequence is nevertheless stopped automatically so that the operator does not have to monitor visually or time the filling of containers 90. The pressure sensing bag filling control described above may also be used with a cargo version of system 10.

One or more final sterile sterilizing or terminal filters 94a, 94b is/are located downstream of Y or T connection 224 as illustrated in FIGS. 10A to 10C. Terminal or sterile sterilizing grade filters 94a, 94b in combination with the purification provided by central water purification station 112 provide a purity for the dialysis fluid, such as HD fluid, which is suitable for delivery as replacement or substitution fluid directly into one or more blood line for HF or HDF. As mentioned above, one final or sterile sterilizing grade filter 94a or 94b may be sufficient to provide the necessary purity, however, two or more of such filters provides redundancy in case one of the filters becomes compromised. In an embodiment, final or sterile sterilizing grade filter 94a or 94b are sized and configured for the number of containers 90 provided with tubing set 220.

For any of the versions of system 10 described herein it is contemplated to test the integrity of filter 80 or at least the upstream terminal or sterile sterilizing grade filter 94a or 94b by wetting the filter(s) with dialysis fluid such that an amount of dialysis fluid flows past the filter(s), wherein the amount is sufficient to push all air back upstream to dialysis machine 60 after the integrity test is complete. Control unit 160 then causes the dialysis fluid pump to pump air in the line leading to filters 80, 94a, 94b until air reaches the filter, at which point the air cannot proceed through a wetted and intact filter. Control unit 160 then causes a pressure to be built and monitored in the line leading to filters 80, 94a, 94b. If the pressure holds, the filter is deemed to be intact. If a pressure decrease is sensed, control unit 160 deems the filter to be compromised and prompts the operator to discard the tubing set including the compromised filter. When filter 80, 94a, 94b is deemed to be intact, dialysis machine 60 removes air to an air collection device and/or through a vent to atmosphere provided by the machine by applying a negative pressure to the filter line, pulling the downstream dialysis fluid back upstream through the at least one filter, and pushing the air back to air collection area or vent at the dialysis machine. Dialysis fluid filling of the containers may then proceed as described herein, wherein the line leading to the filter(s) is primed with dialysis fluid. It should be appreciated that where two sterile sterilizing grade filters 94a, 94b are provided, the above integrity test may not be needed, and the redundancy of the filters may be relied upon instead.

As illustrated in FIG. 10A, it is contemplated for overall tubing set 220 to include separable, treatment tubing sets 230, each downstream from final terminal or sterile sterilizing grade filters 94a, 94b and each including a container 90 and an overpouch 232 housing connector 90c of container or bag 90. In an alternative embodiment, overpouch 232 additionally covers container 90. Overpouch 232 is used for sterilization purposes, wherein all components within the overpouch are sterilized and maintained in such state until use. Overpouch 232 may also lengthen the shelf life of container 90 as discussed below. In an embodiment, overall tubing set 220 is sterilized (e.g., via gamma radiation, ethylene oxide or steam) with treatment tubing sets 230 ganged via filing tubes 236 as illustrated in FIG. 10A. Alternatively, treatment tubing sets 230 having container 90 and overpouch 232 holding connector 90c of container or bag 90 are sterilized individually along with their filling tubes 236. Here, inlet line 222a, inlet line connector 222b, Y or T connection 224, pressure transmission line 226a, pressure transmission line connector 226b and filters 94a, 94b are sterilized together. The treatment tubing sets 230 are then connected together along with the upstream terminal filters 94a, 94b, etc., and the other tubing and connectors.

FIG. 10A illustrates that filling tubes 236, a manifold connector 238 and connecting ports 90p provided on containers 90 enable the containers to be ganged in series, in parallel or in both series and parallel. While two columns of four containers 90 are illustrated in FIG. 10A, it is contemplated to instead provide three or more columns of containers. As discussed herein, the series and/or parallel filling of containers 90 may be performed via control unit 160 (i) causing dialysis machine 60 to meter an amount of fresh dialysis fluid based on the number and volume of containers 90 or (ii) detecting a characteristic static pressure change (discussed above) indicating that each of the containers 90 has been filled.

Depending on the number of containers 90 provided with overall tubing set 220, it is contemplated to hang or otherwise place containers 90 (perhaps only a single container) on a hanger, infusion fluid poll or other type of holder 170 of dialysis machine 60. Alternatively, overall tubing set 220 may be supported by a rack (not illustrated) located adjacent to dialysis machine 60. Dialysis machine 60 and/or the rack may then be provided with a heat sealer or tube welder (illustrated in FIG. 11) for heating sealing container ports 90p closed and for separating treatment tubing sets 230 from one another. Container ports 90p may alternatively be mechanically clamped, cut and capped for sterile separation from each other.

FIG. 10B illustrates that overall tubing set 220 may further include a return line 240a and return line connector 240b for allowing dialysis fluid samples to be returned to dialysis machine 60 for testing. In the illustrated embodiment, return line 240a may have one or more terminal or sterile sterilizing grade filters 94a or 94b, which prevent(s) any backflow in return line 240a from potentially contaminating the dialysis fluid contained within containers 90. The testing of the fluid at dialysis machine 60 may involve any desired form of testing, e.g., any one or more of further conductivity testing, sample removal for microbial, e.g., colony forming unit ("CFU"), testing or chlorine testing.

In particular, one suitable hemodialysis machine for system 10 is an AK 98™ hemodialysis machine produced by the assignee of the present disclosure, which provides a conductivity sensor positioned in a used dialysis fluid path leading to drain. That conductivity sensor may be used to ensure that the dialysis fluid samples have the same (or within an allowed margin of error) conductivity as an expected conductivity. In one embodiment, return line 240a is connected to a dialyzer outlet line of dialysis machine 60, wherein the dialyzer outlet line is the reusable tubing provided with dialysis machine 60 that is normally connected to an outlet of the dialyzer (for a hemodialysis treatment). The operator then commands dialysis machine 60 to suck a sample from containers 90 via return line 240a and send the sample past the conductivity sensor to perform a test measuring the conductivity of the sample. In an embodiment, the sensed conductivity is displayed by dialysis machine 60 for the operator to view and either confirm the batch of filled dialysis fluid containers 90 if the reading is good or discard the batch if the reading is outside of acceptable limits. In another embodiment, dialysis machine 60 is programmed to alarm if the sensed conductivity is outside of the acceptable limits. Otherwise, the filled containers may be assumed to be acceptable.

Assuming the test sample volume to be small, e.g., 100 mL or less, the time needed for dialysis machine 60 to transport the sample to the conductivity sensor will be short. Here, there is a very low risk that bacteria may enter the system via the return line 240a and thus one or more terminal or sterile sterilizing grade filters 94a or 94b in FIG. 10B may not be needed. Nevertheless, it may be desirable as an extra safety precaution to provide such one or more filter as illustrated in FIG. 10B.

If dialysis machine 60 is not equipped with a conductivity sensor that is accessible, system 10 may instead use an external conductivity sensor and alarm and/or readout.

FIG. 10C illustrates that any version of system 10 may further include or provide a standalone valve station 250, e.g., removeably fixed to the rack holding overall tubing set 220. Valve station 250 includes valves 252a to 252d, e.g., a valve for each filling tube 236. Valves 252a to 252d in an embodiment are electrically opened, de-energized closed solenoid pinch valves. Valve station 250 in an embodiment includes power equipment (not illustrated) for supplying power to valves 252a to 252d. Valve station 250 may also include a small microcontroller (not illustrated) for controlling when power is supplied to which valves 252a to 252d. In an embodiment, the microcontroller includes a transceiver that operates wirelessly, e.g., via Bluetooth or WiFi, with a transceiver associated with control unit 160 of dialysis machine 60 (or could operate in a wired manner, e.g., via Ethernet). In such an embodiment, control unit 160 of dialysis machine 60 commands microcontroller 254 to sequence valves 252a to 252d in a desired manner. For instance, control unit 160 of dialysis machine 60 commands the microcontroller to sequence valves 252a to 252d such that the front row of containers 90 is filled first, followed by the second row, then the third row, then the bottom row. The completion of the filling of each row may be via a known amount of dialysis fluid delivered based on number and volume of containers 90 in each row or via a sensed characteristic static pressure change as discussed herein.

In an alternative embodiment, if only two valves are needed, two external clamps provided by dialysis machine 60 may be used instead. The dialysis machine clamps are programmably opened and closed via control unit 160. Here, manifold connector 238 splits into two filling tubes 236, each of which is selectively opened and closed via one of the automated machine clamps.

It is also contemplated for the transceiver operable with control unit 160 of mixing device or dialysis machine 60 in any version of system 10 to communicate wired or wirelessly via a network with an inventory tracking system that logs the number, time and date of fresh dialysis fluid containers 90 prepared and the raw materials consumed. The inventory tracking system may be accessed to know how many containers 90 having differing expiration dates have been produced and at what location, e.g., cargo unit 20, "popup" cleanroom 30, clinic or hospital. The inventory tracking system may also identify raw materials that need to be ordered and delivered and in one embodiment places such orders automatically.

Figure 11:
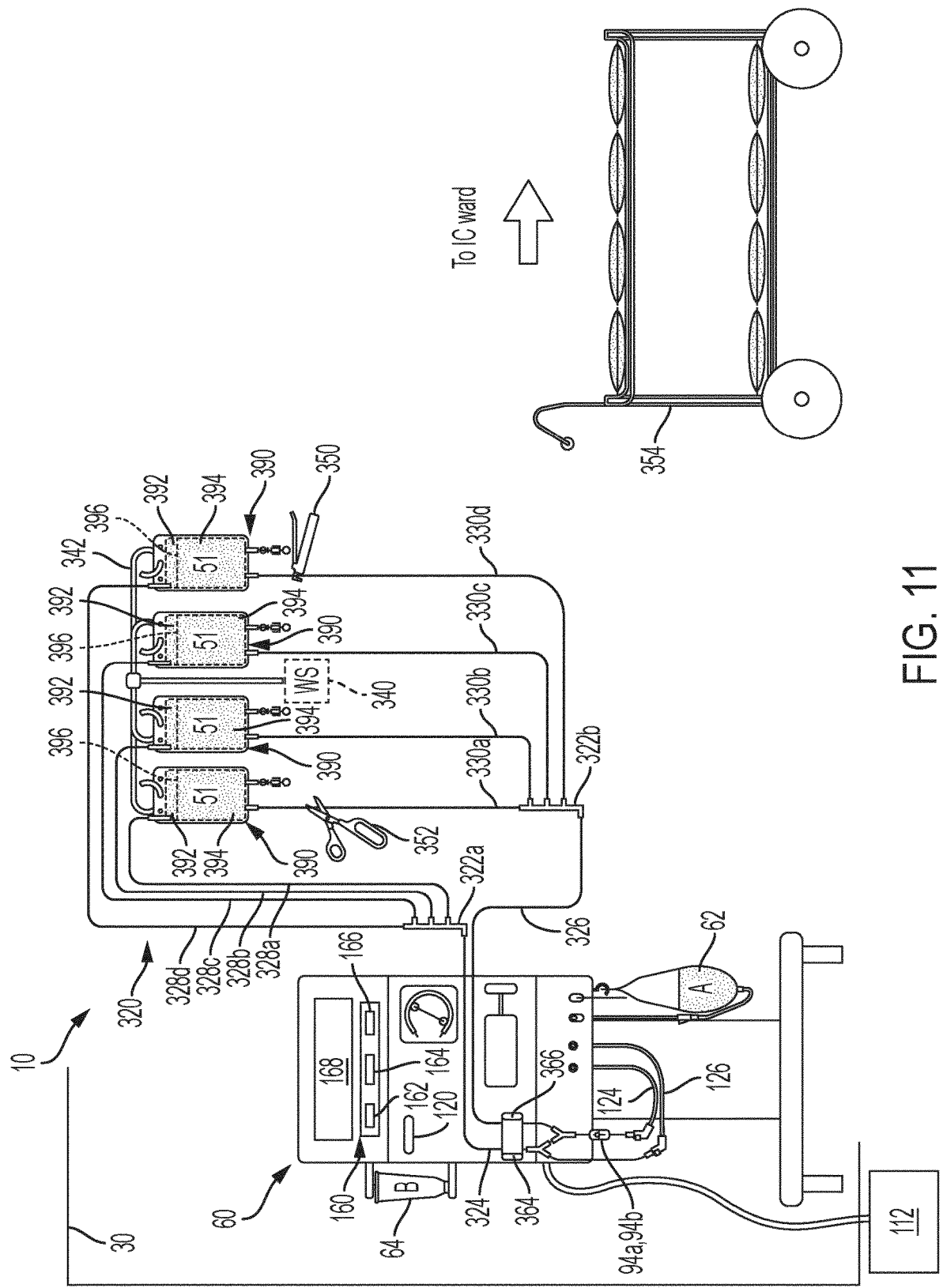
FIG. 11 is a front view illustrating a further alternative embodiment of the system of the present disclosure in which multiple concentrate mixtures provided in a dual chamber container or bag for mixing to form dialysis fluid for hemodialysis ("HD"), replacement/substitution fluid for hemofiltration ("HF") and hemodiafiltration ("HDF") (CVVHD, CVVH and CVVHDF for respective continuous veno venous ("CVV") modalities), or peritoneal dialysis ("PD") are prepared and stored using an alternative dialysis machine and tubing set, which may be placed in a mobile cargo unit or "popup" cleanroom.

Referring now to FIG. 11, another alternative embodiment of system 10 of the present disclosure is illustrated for producing fluid for HD, replacement or substitution fluid for HF or HDF, PD fluid or any of the intravenous fluids discussed herein. System 10 of FIG. 11 is also useful for a "popup" cleanroom 30 provided in the hospital, center or clinic. It should be appreciated however that any of the teachings discussed in connection with FIG. 11, in particular the preparation and storing of component solutions for eventual mixing to form a final fluid, are equally applicable to system 10 using cargo unit 20. FIG. 11 illustrates that a central water purification station 112 may be located outside cleanroom 30, which feeds a dialysis machine 60 located inside cleanroom 30.

The primary difference with system 10 of FIG. 11 is that a final dialysis fluid or replacement/substitution fluid is not created, instead dialysis fluid concentrate mixtures are created and stored in containers for final mixing at the time of use. Dialysis machine 60 in FIG. 11 includes all of the structure and functionality discussed above. In particular, dialysis machine 60 includes at least one mixing pump for mixing WFD from central water purification station 112 with HD concentrates 62, 64. Dialysis machine 60 in one embodiment includes a purified water pump that pulls WFD from central water purification station 112, such that central water purification station 112 may, but does not have to, supply its own water pressure. In an alternative embodiment, central water purification station 112 includes one or more pump that pumps WFD under positive pressure to dialysis machine 60. Here, dialysis machine 60 does not have to have a pump to pump WFD from central water purification station 112.

In any case, dialysis machine 60 includes pumps for mixing dialysis, e.g., hemodialysis, concentrate with WFD for delivering dialysis fluid components from the hemodialysis machine. Dialysis machine 60 again includes a first concentrate pump for metering A-concentrate or acid from an acid concentrate container 62 into the WFD to form an acid solution and a second concentrate pump for metering purified into a B-concentrate or bicarbonate cartridge to form a bicarbonate solution. One or more conductivity cell is/are used in one embodiment to ensure the proper proportioning of acid concentrate 62 with WFD and the proportioning of WFD with bicarbonate concentrate 64. The conductivity readings may be temperature compensated. Dialysis machine 60 may also include a heater, such as an inline heater. The heater may or may not be energized during the preparation of the dialysis solutions for storage in alternative dual chamber containers or bags 390.

Dialysis machine 60 also includes a pump, e.g., the fresh dialysis fluid pump of the machine, for delivering the fresh (possibly heated) dialysis fluid, e.g., hemodialysis solutions at a desired or settable pressure and/or flowrate, e.g., 750 mm Hg or less and 300 to 800 mL/min, e.g., 500 mL/min. The pressure depends on the length of the overall tubing leading to containers 390, wherein the containers do not add significantly to the required pressure until becoming full. One or more sterile sterilizing grade filter(s) 94a, 94b add significantly to pressure drop and is/are therefore sized and numbered so as to provide an overall pressure drop that is within the capability of dialysis machine 60, e.g., 750 mm Hg or less.

System 10 of FIG. 11 is provided with an alternative large overall tubing set 320, which includes alternative containers 390. Any portion of tubing set 320 may be formed from any one or more plastic, e.g., polyvinylchloride ("PVC") or a non-PVC material, such as polyethylene ("PE"), polyurethane ("PU") or polycarbonate ("PC"). Tubing set 320 includes two manifolds 322a and 322b, one for each concentrate 62 and 64. An A-concentrate manifold line 324 carries a combination of A-concentrate or acid and WFD from dialysis machine 60 to manifold 322a. A B-concentrate manifold line 326 carries a combination of B-concentrate or bicarbonate and WFD from dialysis machine 60 to manifold 322b. A-concentrate manifold line 324 and B-concentrate manifold line 326 may be connected via Y or T-connectors as illustrated, e.g., for priming purposes and for flushing reusable supply line 124 after filling a first component solution and before filling a second component solution. Lines 324 and 326 and their respective concentrate solutions are controlled independently via outer automated machine clamps 364 and 366, respectively, wherein the automated machine clamps 364 and 366 are under control of control unit 160 having one or more processor 162, one or more memory 164 and a video controller 166 for controlling user interface 168.

Manifold lines 324 and 326 of tubing set 320 in the illustrated embodiment connect to reusable supply lines 124 dialysis machine 60, which has a reusable connector, and which may for example be the reusable fresh dialysis fluid line normally connected to a dialyzer for treatment. The pair of Y or T connectors when machine clamps 364 and 366 are both closed enables a flushing fluid, e.g., WFD to flush a concentrated solution from reusable supply line 124 down reusable drain line 126 to machine drain. After the filling of alternative containers 390 and the removal of tubing set 320 from reusable lines 124 and 126, the reusable connectors of reusable lines 124 and 126 may be connected to docking ports in dialysis machine 60 or together, after which and a short disinfection cycle, e.g., via heated WFD, may be performed while a next tubing set 320 is installed for a next fill.

Fill lines 328a to 328d lead from manifold 322a to an A-concentrate compartment 392 of each of dual chamber containers or bags 390. While four fill lines 328a to 328d are illustrated, any desired number of fill lines 328n may be provided alternatively. Fill lines 330a to 330d lead from manifold 322b to a B-concentrate compartment 394 of each of dual chamber containers or bags 390. Again, while four fill lines 330a to 330d are illustrated, any desired number of fill lines 330n may be provided alternatively, wherein 330n equals 328n.

In any desired order, dialysis machine 60 of system 10 of FIG. 11 under control of control unit 160 mixes A-concentrate or acid from A-concentrate source 62 in a desired ratio with WFD and delivers a desired amount of the A-concentrate solution to the A-concentrate compartment 392 of each of dual chamber container or bag 390. Dialysis machine 60 under control of control unit 160 mixes WFD with B-concentrate or bicarbonate in B-concentrate cartridge 62 in a desired ratio and delivers a desired amount of the B-concentrate solution to the B-concentrate compartment 394 of each of dual chamber container or bag 390. Compartments 392 and 394 in one embodiment are separated by a frangible seal 396, which a nurse, clinician or patient opens at the time of use to allow the A-concentrate solution and the B-concentrate solution to mix together to form an overall HD or replacement/substitution fluid for treatment. The volume of the finally mixed HD or replacement/substitution fluid is any desired amount, e.g., one, two, four, five or six liters.

The volumes of the A-concentrate solution and the B-concentrate solution delivered to compartments 392 and 394, respectively, need to be relatively precise. It is accordingly contemplated to use an accurate dialysis fluid pump of dialysis machine 60, e.g., a piston pump, or a less accurate dialysis fluid pump, e.g., a gear pump, in combination with one or more flowmeter outputting to control unit 160. Here, control unit 160 is programmed to pump the needed volumes of A-concentrate or acid solution and the B-concentrate or bicarbonate solution and to stop pumping and close clamps 364 and 366 when the programmed volumes are reached.

Alternatively, an optional weigh scale 340 may be provided to weigh containers or bags 390 as they hang from a multi-unit hanger or holder 342. Weigh scale 340 outputs wired or wirelessly to control unit 160, which is programmed to stop pumping and close clamps 364 and 366 when the programmed A-concentrate or acid solution weight and the B-concentrate or bicarbonate solution weight are reached.

It should be appreciated that the connection of reusable lines 124 and 126 of dialysis machine 60 to corresponding disposable lines of tubing set 320 may be performed within laminar air hood 40 located within cleanroom 30 using tilted tray 46a discussed above to reduce spillage. The lengths of reusable lines 124 and 126 of dialysis machine 60 and corresponding disposable lines of tubing set 320 are increased as needed to do so. Making such connections within hood 40 reduces the bioburden placed on one or more sterile sterilizing grade filters 94a, 94b.

System 10 of FIG. 11 also illustrates structure and functionality for separating any of the containers or bags 90 or 390 discussed herein from the remainder of a tubing set, here tubing set 320. In FIG. 4 for system 10, the structure and functionality described here could be used to separate containers or bags 90 from manifold 100. In FIGS. 10A to 10C, the structure and functionality described here could be used to separate containers or bags 90 from overall tubing set 220. The structure includes a handheld heat sealer 350, which may for example be a Sebra® 1105 Heat Sealer, and which seals closed both fill lines 328a to 328d and fill lines 330a to 330d. If needed, each fill line may be sealed two or more times for extra security. After sealing, each of fill lines 328a to 328d and 330a to 330d may be clamped below the heat seal(s) to prevent spillage, e.g., via a Roberts™ clamp, and then cut via scissors 352 between heat seal(s) and the clamps. The separated containers or bags 390 may then be labeled via a label printed at label printer 120 of dialysis machine 60 or via a separate label printer, wherein the label may include any of the information discussed herein. Once separated containers or bags 390 are labeled, they may be loaded onto a cart 354 and delivered to the point of use.

The dual chamber containers or bags 390 having separate A- or acid and B- or bicarbonate concentrate solutions have a potentially longer shelf life than containers or bags 90 holding a finally mixed HD or replacement/substitution fluid solution. The finally mixed solutions may precipitate over time and may experience bicarbonate decomposition, leading to a shorter shelf life. Additionally, to improve shelf life it is contemplated to apply a gas barrier overpouch after filling compartments 392 and 394 of container 390. Separating the dialysis fluid solutions into compartments or chambers 392 and 394 avoids the precipitation of Calcium and Magnesium in the bicarbonate solution, but not the decomposition of bicarbonate (given the pH 7-8 of the bicarbonate solution). To prevent decomposition, a gas-barrier overpouch (e.g., overpouch 232 illustrated above) is to be applied after filling the units compartments 392 and 394. The overpouch may for example may be applied manually by the operator and then to be sealed with via heat sealer.

It is also contemplated to alternatively provide prefilled acid and bicarbonate chambers for HD systems 10 and to instead supply sterilized or WFD to an initially empty, e.g., the largest chamber. When the one or more frangible seal is broken, the concentrates mix with the sterilized or WFD to form dialysis fluid, e.g., HD fluid or substitution fluid for HF or HDF. Here, (i) the amount and concentration of the one or more concentrate and (ii) the amount and formulation of the dialysis fluid or the amount of sterilized or WFD are selected to provide a desired volume and overall formulation of HD, HF or HDF treatment fluid. Providing separate prefilled and sterilized concentrate chambers may again be desirable, for example, to increase shelf life of a filled container 90.

It should be understood that various changes and modifications to the presently preferred embodiments described herein will be apparent to those skilled in the art. It is therefore intended that such changes and modifications be covered by the appended claims. For example, while system 10 has been described mainly in connection with supplying dialysis fluid for blood treatments, however, the system using different concentrates or additives is configurable to provide other types of medical fluids such as PD fluid, saline, or an intravenous fluid including lactated ringers, NaCl fluids and/or nutritional solution. Moreover, while mixing device or dialysis machine 60 is illustrated and described as being inside cleanroom 30, the device or machine may be located alternatively outside of the cleanroom. Additionally, in an alternative embodiment for system 10, certain purification and sterilization features may be modified, e.g., downstream inline filtration may be lessened and laminar flow hood 40 may be removed, and wherein filled dialysis fluid containers 90 are instead placed in an autoclave located within cargo unit 20 for a prescribed amount of time during which dialysis fluid containers 90 are steam sterilized. Further additionally, it is expressly contemplated to automate, via one or more robotic structure or machine, any and all of the manual steps discussed above and otherwise associated with the loading, filling and unloading of the medical fluid containers inside of the cargo unit and inside of the cleanroom, including the cargo unit cleanroom and the "popup" cleanroom.

The invention claimed is:

1. A mobile dialysis fluid generation system comprising:
a cargo unit configured to be transported by a vehicle;
a cleanroom located inside the cargo unit;
water purification equipment;
at least one dialysis fluid preparation unit located inside or outside the cleanroom, the at least one dialysis fluid preparation unit including
at least one concentrate,
a mixing device configured to receive purified water from the water purification equipment and to mix the purified water with the at least one concentrate to form a dialysis fluid,
a tubing set for transfer of the dialysis fluid from the mixing device to a container positioned and arranged inside the cleanroom to receive the dialysis fluid; and
at least one area provided outside the cleanroom but inside the cargo unit for storing at least one of a raw material or containers filled with dialysis fluid.

2. The mobile dialysis fluid generation system of claim 1, wherein the cleanroom includes a laminar flow hood positioned and arranged to direct purified air in a laminar manner to a location at which the dialysis fluid is received by the container.

3. The mobile dialysis fluid generation system of claim 2, which includes a plurality of the containers configured to receive dialysis fluid from at least one dialysis fluid preparation unit, and wherein the laminar flow hood includes a tilted tray for holding and angling one of the plurality of the containers upwardly for connecting to a filling line delivering the dialysis fluid.

4. The mobile dialysis fluid generation system of claim 3, wherein the tilted tray is configured to swivel so that the container angled by the tilted tray may be directed upwardly to an open filling line extending from one or more of mixing device.

5. The mobile dialysis fluid generation system of claim 1, wherein the water purification equipment is located inside the cleanroom and includes at least one form of purification selected from the group consisting of: reverse osmosis ("RO"), ultraviolet ("UV") radiation, electrodeionization, ultrafiltration, ion-exchange resins, heat disinfection, distillation, and forward osmosis.

6. The mobile dialysis fluid generation system of claim 1, which includes a conveyor leading from inside the cleanroom to outside the cleanroom.

7. The mobile dialysis fluid generation system of claim 1, wherein the mixing device includes a dialysis machine configured to receive purified water from the water purification equipment and to mix the purified water with the at least one concentrate to form dialysis fluid.

8. The mobile dialysis fluid generation system of claim 7, wherein the dialysis machine is operated in a non-treatment mode while receiving purified water from the water purification equipment and mixing the purified water with the at least one concentrate to form dialysis fluid.

9. The mobile dialysis fluid generation system of claim 8, which includes a recirculation container in recirculation fluid communication with the dialysis machine to enable operation of the dialysis machine in the non-treatment mode.

10. The mobile dialysis fluid generation system of claim 7, wherein the tubing set is provided with a filter downstream of the dialysis machine and upstream from the container, the filter provided with at least one connector blocked so that dialysis fluid delivered from the dialysis machine to the filter is forced through pores of a plurality of membranes housed by the filter for filtration of the dialysis fluid.

11. The mobile dialysis fluid generation system of claim 10, wherein the tubing set includes an outlet line leading from the filter to the container, and wherein the outlet line includes at least one additional filter.

12. The mobile dialysis fluid generation system of claim 1, wherein the tubing set includes a plurality of containers positioned and arranged to receive the dialysis fluid, and which includes a filter located upstream and/or downstream of the plurality of containers.

13. The mobile dialysis fluid generation system of claim 12, wherein the filter is (i) a reusable filter including an ultrafilter or dialyzer or (ii) a sterile sterilizing grade filter packaged with the tubing set.

14. The mobile dialysis fluid generation system of claim 12, wherein the filter is packaged and presterilized with the plurality of containers.

15. The mobile dialysis fluid generation system of claim 12, which includes a tilted tray for holding and angling the filter upwardly for connecting to a filling line delivering the dialysis fluid.

16. The mobile dialysis fluid generation system of claim 1, which includes at least one of a weigh scale or a timer for controlling an amount of dialysis fluid received by plurality of the containers.

17. The mobile dialysis fluid generation system of claim 1, wherein the at least one concentrate is configured to prepare dialysis fluid for a blood treatment or peritoneal dialysis, or an intravenous fluid including saline, an NaCl fluid or a nutritional fluid.

18. A mobile medical fluid generation system comprising:
a cargo unit configured to be transported by a vehicle;
a cleanroom located inside the cargo unit;
water purification equipment located inside the cargo unit;
at least one medical fluid preparation unit located inside or outside the cleanroom, the at least one medical fluid preparation unit including:
at least one concentrate located inside the cargo unit;
a mixing device configured to receive purified water from the water purification equipment and to mix the purified water with at least one concentrate to form a medical fluid, the mixing device being located inside the cargo unit;
a container positioned and arranged inside the cleanroom to receive the medical fluid, and
a tubing set configured to transfer of the medical fluid from the mixing device to the container; and
at least one area provided outside the cleanroom but inside the cargo unit for storing at least one of a raw material including multiple tubing sets or containers filled with medical fluid.

19. The mobile medical fluid generation system of claim 18, wherein the medical fluid is a blood treatment dialysis fluid, a peritoneal dialysis fluid, or an intravenous fluid including saline, lactated ringers, an NaCl fluid or a nutritional solution.

20. The mobile medical fluid generation system of claim 18, wherein one or more of the water purification equipment, the at least one concentrate, and the mixing device is located inside the cleanroom.

21. The mobile medical fluid generation system of claim 18, wherein the tubing set includes at least one sterile sterilizing grade filter for further filtering the medical fluid before reaching the container.

22. A medical fluid generation system including a modular cleanroom for generating dialysis fluid, the modular cleanroom comprising:
water purification equipment;
at least one container positioned and arranged to receive the dialysis fluid;
at least one dialysis fluid preparation unit including:
at least one concentrate;
a mixing device configured to receive purified water from the water purification equipment and to mix the purified water with the at least one concentrate to form dialysis fluid;
a tubing set for transfer of the dialysis fluid from the mixing device to the container arranged to receive the dialysis fluid;
at least one filter positioned and arranged to filter the dialysis fluid; and
a tilted tray configured to tilt a connector end of the at least one container upward for receiving a filling line extending from the at least one filter.

23. The medical fluid generation system of claim 22, which includes a laminar flow hood positioned and arranged to direct purified air in a laminar manner to a location at which the filling line is received by the container.

24. The medical fluid generation system of claim 22, wherein the at least one filter is provided as a set with the at least one container and the at least one filter comprises either or both:
a first reusable filter positioned and arranged at the mixing device to filter the medical fluid; and
a second disposable filter provided as a set with the at least one container to further filter the medical fluid, the second disposable filter located upstream of and/or downstream from the container.

* * * * *